US012000421B2

(12) United States Patent
Gong et al.

(10) Patent No.: US 12,000,421 B2
(45) Date of Patent: Jun. 4, 2024

(54) SELF-DRILLING SELF-TAPPING FASTENER

(71) Applicant: Illinois Tool Works Inc., Glenview, IL (US)

(72) Inventors: Yongping Gong, Wilmette, IL (US); Randall Derek Riffle, Lake Villa, IL (US); Mark Latz, Stuart, FL (US); Alex Baciu, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 317 days.

(21) Appl. No.: 17/521,442

(22) Filed: Nov. 8, 2021

(65) Prior Publication Data

US 2022/0213919 A1 Jul. 7, 2022

Related U.S. Application Data

(60) Provisional application No. 63/134,785, filed on Jan. 7, 2021.

(51) Int. Cl.
*F16B 25/00* (2006.01)
*F16B 25/10* (2006.01)

(52) U.S. Cl.
CPC ........ *F16B 25/0084* (2013.01); *F16B 25/103* (2013.01); *F16B 25/00* (2013.01); *F16B 25/0021* (2013.01)

(58) Field of Classification Search
CPC .. F16B 25/00; F16B 25/0021; F16B 25/0031; F16B 25/0084; F16B 25/103
USPC .... 411/386, 387.1, 387.6, 387.7, 387.8, 411, 411/424
See application file for complete search history.

(56) References Cited

U.S. PATENT DOCUMENTS

| 389,166 A | 9/1888 | Rogers |
| 452,064 A | 5/1891 | Rogers |
| 2,373,948 A | 4/1945 | De |
| 2,479,730 A | 8/1949 | Dewar |
| 3,079,831 A | 3/1963 | Gutshall |
| 3,093,028 A | 6/1963 | Mathie |
| 3,238,836 A | 3/1966 | Johnson |
| 3,241,426 A | 3/1966 | Gutshall |
| 3,245,097 A | 4/1966 | Ferre |
| 3,310,822 A | 3/1967 | Mcclellan et al. |
| 3,334,211 A | 8/1967 | Wheeler et al. |
| 3,438,299 A | 4/1969 | Gutshall |
| 3,463,045 A | 8/1969 | Prescott |

(Continued)

FOREIGN PATENT DOCUMENTS

| DE | 202019101758 U1 | 4/2019 |
| EP | 0 125 131 | 11/1984 |

(Continued)

OTHER PUBLICATIONS

Teks Select™, product data sheet, ITW Buildex, published 2011 (2 pages).

(Continued)

*Primary Examiner* — Roberta S Delisle
(74) *Attorney, Agent, or Firm* — Neal, Gerber & Eisenberg LLP

(57) ABSTRACT

A self-drilling self-tapping fastener that provides improved performance in both drilling time and pullout force without decreasing performance in any of ductility, tapping torque, torsional strength, and tension strength.

27 Claims, 21 Drawing Sheets

(56) References Cited

U.S. PATENT DOCUMENTS

| | | |
|---|---|---|
| 3,683,436 A | 8/1972 | Reiland |
| 3,754,292 A | 8/1973 | Reiland |
| 3,786,713 A | 1/1974 | Sygnator |
| 3,789,725 A | 2/1974 | Lindstrom |
| 4,034,641 A | 7/1977 | Williams et al. |
| 4,044,731 A | 8/1977 | Lindner |
| 4,084,478 A | 4/1978 | Simmons |
| 4,114,507 A | 9/1978 | Fischer et al. |
| 4,184,217 A | 1/1980 | Dohi |
| 4,237,566 A | 12/1980 | Castiglioni |
| 4,295,768 A | 10/1981 | Skierski |
| 4,321,001 A | 3/1982 | Gruich |
| 4,480,952 A | 11/1984 | Jeremias |
| 4,557,100 A | 12/1985 | Gorges |
| 4,568,229 A | 2/1986 | Hulsey |
| 4,730,969 A | 3/1988 | Dohi |
| 4,781,506 A | 11/1988 | Roberts et al. |
| 4,787,792 A | 11/1988 | Jesson |
| 4,836,730 A | 6/1989 | Jesson |
| 4,869,629 A | 9/1989 | Witzigman |
| 4,881,861 A | 11/1989 | Hewison |
| 4,936,395 A | 6/1990 | Enderle |
| 4,958,972 A | 9/1990 | Shinjo |
| 4,996,860 A | 3/1991 | Shinjo |
| RE33,901 E | 4/1992 | Shinjo |
| 5,354,155 A | 10/1994 | Adams |
| 5,382,195 A | 1/1995 | Hiler |
| 5,403,137 A | 4/1995 | Grun |
| 5,499,896 A | 3/1996 | Cafarelli |
| 5,520,491 A * | 5/1996 | Miyagawa ........... F16B 25/0021 411/386 |
| 5,755,542 A | 5/1998 | Janusz et al. |
| 5,928,236 A | 7/1999 | Augagneur |
| 5,947,670 A | 9/1999 | Larson |
| 5,980,390 A | 11/1999 | Ferrante |
| 6,017,274 A | 1/2000 | Sherman et al. |
| 6,176,664 B1 | 1/2001 | Roberts |
| 6,485,371 B2 | 11/2002 | Sakamura et al. |
| 6,558,097 B2 | 5/2003 | Mallet et al. |
| 6,643,877 B1 | 11/2003 | Amtenbrink et al. |
| 6,874,986 B2 * | 4/2005 | Koppel ................. F16B 33/008 411/386 |
| 6,923,611 B2 | 8/2005 | Kenny |
| 7,033,117 B2 | 4/2006 | Ludwig et al. |
| 7,090,452 B2 * | 8/2006 | Chen ................... F16B 25/0089 411/387.1 |
| 7,175,533 B2 | 2/2007 | Franco et al. |
| 7,393,170 B2 | 7/2008 | Chen |
| 7,421,875 B2 | 9/2008 | Franco et al. |
| 7,484,920 B2 | 2/2009 | Wieser et al. |
| 7,611,107 B2 | 11/2009 | Howell |
| 7,631,532 B2 | 12/2009 | Franco et al. |
| 7,836,745 B2 | 11/2010 | Tseng et al. |
| 7,856,955 B2 | 12/2010 | Jucknath et al. |
| 8,408,856 B2 * | 4/2013 | Ernst ................... F16B 25/0084 411/371.2 |
| 8,419,332 B2 * | 4/2013 | Kochheiser ........... F16B 5/0275 411/426 |
| 8,613,579 B2 * | 12/2013 | Loichinger ......... F16B 25/0031 411/387.1 |
| 8,616,039 B2 | 12/2013 | Maloney |
| 8,955,418 B2 | 2/2015 | Peters et al. |
| 9,194,416 B2 | 11/2015 | Zach et al. |
| 9,694,432 B2 | 7/2017 | Inglis |
| 2001/0014262 A1 * | 8/2001 | Friederich ........... C21D 9/0093 411/386 |
| 2002/0127085 A1 | 9/2002 | Field |
| 2004/0018069 A1 * | 1/2004 | Lai ..................... F16B 25/0031 411/387.1 |
| 2004/0151558 A1 | 8/2004 | Klopper |
| 2004/0182209 A1 | 9/2004 | Franco et al. |
| 2004/0252597 A1 | 12/2004 | Nakata et al. |
| 2005/0244248 A1 | 11/2005 | Avganim |
| 2006/0022389 A1 | 2/2006 | Svendsen et al. |
| 2006/0229133 A1 | 10/2006 | Lin |
| 2007/0110544 A1 * | 5/2007 | Friederich ............... C22C 21/06 411/387.4 |
| 2009/0214321 A1 | 8/2009 | Wang et al. |
| 2009/0232619 A1 | 9/2009 | Baumgartner et al. |
| 2011/0045915 A1 | 2/2011 | Wang |
| 2011/0070050 A1 | 3/2011 | Woo |
| 2011/0097172 A1 | 4/2011 | Maloney |
| 2011/0188964 A1 | 8/2011 | Hung |
| 2011/0206468 A1 | 8/2011 | Ayrle |
| 2011/0255936 A1 * | 10/2011 | Stager ................. F16B 25/0021 411/387.1 |
| 2012/0070247 A1 | 3/2012 | Tashima et al. |
| 2013/0011215 A1 | 1/2013 | Wells et al. |
| 2013/0324270 A1 | 12/2013 | Wu |
| 2015/0093213 A1 * | 4/2015 | Scheerer ................. F16B 25/103 411/411 |
| 2016/0001348 A1 | 1/2016 | Neumaier et al. |
| 2016/0003282 A1 | 1/2016 | Neumaier et al. |
| 2016/0003284 A1 | 1/2016 | Neumaier et al. |
| 2018/0100534 A1 | 4/2018 | Dill |
| 2018/0185996 A1 | 7/2018 | Foser |
| 2018/0209139 A1 | 7/2018 | Tu |
| 2018/0283435 A1 | 10/2018 | Hakenholt et al. |
| 2019/0063480 A1 | 2/2019 | Lajewardi |

FOREIGN PATENT DOCUMENTS

| | | |
|---|---|---|
| EP | 2581612 A1 | 4/2013 |
| JP | H10 47324 | 2/1998 |
| JP | 2010 116949 | 5/2010 |
| TW | 201516279 A | 5/2015 |

OTHER PUBLICATIONS

Australian Examination Report from Australian Application No. 2022200050, dated Apr. 18, 2023 (6 pages).
Extended European Search Report for European Application No. 22150121.6, dated Sep. 12, 2022 (7 pages).

* cited by examiner

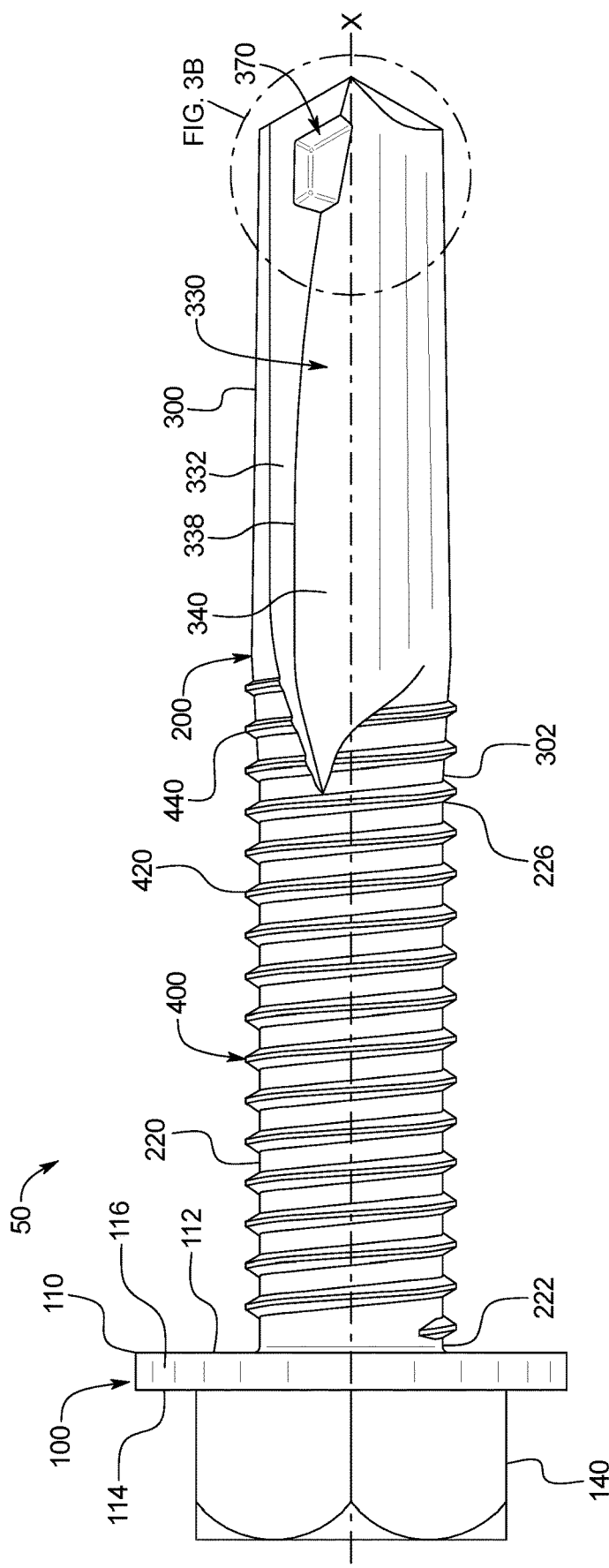

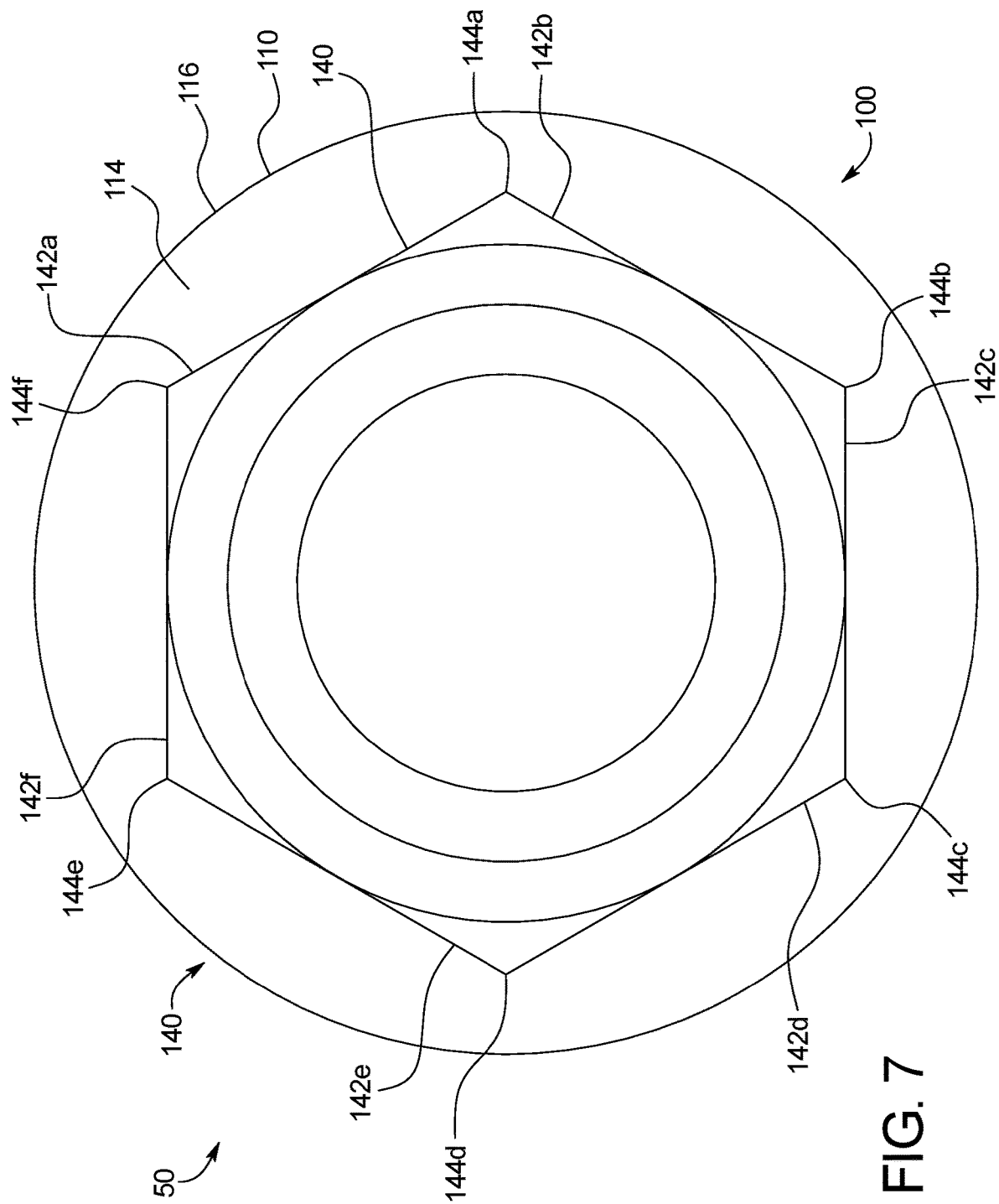

FIGURE 9 TABLE 1 - Self-drilling Self-Tapping Fastener Parameter Comparison

| Comparable Samples | Fastener-A | Fastener 50 | Fastener-B | Fastener-C | Fastener-D | Fastener-E | Fastener-F |
|---|---|---|---|---|---|---|---|
| Product description | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Material | 1022 Carbon Steel | 1022 Carbon Steel | 1022 Carbon Steel | 1022 Carbon Steel | 1022 Carbon Steel | 1022 Carbon Steel | 1022 Carbon Steel |
| Heat treatment | Case Harden | Case Harden | Case Harden | Case Harden | Case Harden | Case Harden | Case Harden |
| Case hardness @0.003" (HRC) | 52.0 | 53.3 | 54.9 | 52.5 | 55.4 | 52.7 | 54.1 |
| Case hardness @0.005" (HRC) | 50.7 | 52.2 | 51.9 | 50.2 | 55.0 | 52.1 | 51.4 |
| Case hardness @0.009" (HRC) | 42.2 | 45.2 | 45.8 | 43.7 | 53.0 | 45.1 | 45.3 |
| Core hardness (HRC) | 38.4 | 37.0 | 40.2 | 39.9 | 42.3 | 37.1 | 40.6 |

FIGURE 10 TABLE 2 - Self-Drilling Self-Tapping Fastener Dimensional Inspection Results

| Comparable Samples | | Fastener-A | Fastener 50 | Fastener-B | Fastener-C | Fastener-D | Fastener-E | Fastener-F |
|---|---|---|---|---|---|---|---|---|
| Product description | | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Drill Point - 300 | | | | | | | | |
| Point manufacturing method | - | Milling | Forging | Forging | Forging | Forging | Forging | Forging |
| Special point feature | - | - | - | Chip breaker | - | Chip breaker | - | Chip breaker | - |
| Flute length (inch) | P1 | 0.188 | 0.141 | 0.209 | 0.166 | 0.134 | 0.163 | 0.116 |
| Flute angle (°) | P2 | 9.5 | 13.6 | 26.0 | 29.3 | 20.3 | 14.0 | 29.5 |
| Flute/relief length (inch) | P3 | 0.785 | 0.711 | 0.811 | 0.722 | 0.828 | 0.668 | 0.782 |
| Relief angle (°) | P4 | 12 | 5.2 | 1.9 | 4.8 | 5.0 | 2.9 | 0.6 |
| Point OD (inch) | P5 | 0.197 | 0.199 | 0.193 | 0.196 | 0.198 | 0.200 | 0.196 |
| Point thickness (inch) | P6 | 0.127 | 0.119 | 0.116 | 0.112 | 0.131 | 0.125 | 0.130 |
| Point height (inch) | P7 | 0.667 | 0.060 | 0.066 | 0.061 | 0.069 | 0.066 | 0.063 |
| Point cutting edge angle (°) | P8 | 135.5 | 110.6 | 110.6 | 111.1 | 103.9 | 112.0 | 107.4 |
| Point flute angle (°) | P9 | 105.5 | 90.0 | 83.4 | 85.5 | 89.4 | 80.0 | 90.7 |
| Cutting edge web thickness (inch) | P10 | 0.007 | 0.013 | 0.024 | 0.008 | 0.028 | 0.011 | 0.012 |
| Cutting edge center distance (inch) | P11 | -0.022 | 0.005 | 0.014 | 0.002 | 0.002 | 0.008 | 0.001 |
| Flute detail radius (inch) | P12 | 0.035 | 0.011 | 0.016 | 0.018 | 0.020 | 0.013 | 0.014 |
| Point outside radius (inch) | P13 | 0.099 | 0.072 | 0.075 | 0.041 | 0.055 | 0.067 | 0.065 |
| Point eccentricity (inch) | P14 | 0.0265 | 0.0023 | 0.0219 | 0.0010 | 0.0065 | 0.0318 | 0.0113 |
| Thread - 200 | | | | | | | | |
| Fastener length (inch) | T1 | 1.252 | 1.245 | 1.261 | 1.285 | 1.223 | 1.225 | 1.261 |
| Distance from 1st root to head (inch) | T2 | 0.082 | 0.075 | 0.050 | 0.082 | 0.042 | 0.061 | 0.060 |
| Thread OD (inch) | T3 | 0.215 | 0.217 | 0.210 | 0.211 | 0.216 | 0.212 | 0.213 |
| Thread length (inch) | T4 | 0.659 | 0.632 | 0.609 | 0.721 | 0.617 | 0.542 | 0.627 |
| Pitch distance (inch - 24 tpi) | T5 | 0.0417 | 0.0417 | 0.0417 | 0.0417 | 0.0417 | 0.0417 | 0.0417 |
| Other thread feature | - | - | - | 3 grooves | - | 3 grooves | - | - |
| Root O.D. (inch) | T6 | 0.187 | 0.186 | 0.164 | 0.182 | 0.188 | 0.170 | 0.156 |
| Blank O.D. (inch) | T7 | 0.196 | 0.195 | 0.192 | 0.196 | 0.197 | 0.189 | 0.191 |
| Thread member at run-out | T8 | 1 | 1 | 1 | 1 | 1 | 1 | 1 |
| Thread member at flute transition | T9 | 4 | 3 | 5 | 3 | 6 | 0 | 4 |
| Thread up taper (inch) | T10 | 0.003 | 0.002 | -0.003 | 0.000 | 0.001 | -0.002 | 0.007 |
| Thread Engagement (inch) | T11 | 0.0185 | 0.0183 | 0.0168 | 0.0153 | 0.0180 | 0.0120 | 0.0168 |
| Head - 100 | | | | | | | | |
| Head style | - | HWH | HWH | HWH | HWH | HWH | HWH | HWH |
| Head eccentricity (inch) | H1 | 0.005 | 0.007 | 0.010 | 0.013 | 0.004 | 0.001 | 0.001 |
| Hex height (inch) | H2 | 0.149 | 0.150 | 0.149 | 0.150 | 0.147 | 0.153 | 0.160 |
| Hex wrench height (inch) | H3 | 0.113 | 0.114 | 0.107 | 0.115 | 0.105 | 0.107 | 0.120 |
| Hex across flat (inch) | H4 | 0.306 | 0.306 | 0.307 | 0.307 | 0.307 | 0.308 | 0.306 |
| Hex across corner (inch) | H5 | 0.351 | 0.351 | 0.349 | 0.355 | 0.347 | 0.348 | 0.353 |
| Washer thickness (inch) | H6 | 0.038 | 0.035 | 0.036 | 0.036 | 0.046 | 0.038 | 0.039 |
| Washer diameter (inch) | H7 | 0.412 | 0.412 | 0.413 | 0.415 | 0.424 | 0.410 | 0.402 |
| Radius under head (inch) | H8 | 0.252 | 0.016 | 0.025 | 0.036 | 0.031 | 0.030 | 0.029 |

FIGURE 11  TABLE 3 - Self-Drilling Self-Tapping Fastener Ductility vs. Core Hardness Comparison

| Comparable Samples | Fastener-A | Fastener 50 | Fastener-B | Fastener-C | Fastener-D | Fastener-E | Fastener-F |
|---|---|---|---|---|---|---|---|
| Product description | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Bend test[1] | 5/5 Passed | 5/5 Passed | 5/5 Passed | 5/5 Passed | 4/5 Passed | 5/5 Passed | 5/5 Passed |
| Ductility[2] | 50 | 50 | 50 | 50 | 40 | 50 | 50 |
| Core hardness (HRC) | 38.4 | 37.0 | 40.2 | 39.9 | 42.3 | 37.1 | 40.6 |
| Case hardness @0.009" (HRC) | 42.2 | 45.2 | 45.8 | 43.7 | 53.0 | 45.1 | 45.3 |

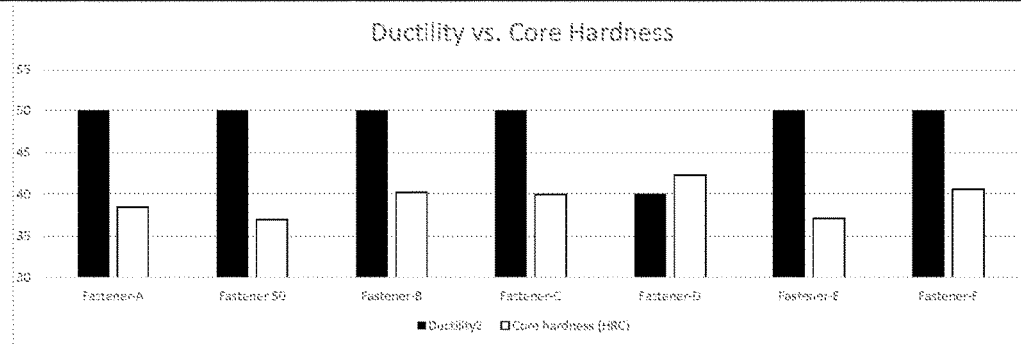

Notes:

1. Used 10 degree head bend test to measure fastener's ductility.

2. Tested 5 samples from each comparable sample. Assigned 10 scores to each passed sample, 0 scores to each failed sample.

FIGURE 12 TABLE 4 - Self-Drilling Self-Tapping Fastener Torsional Strength vs. Root Diameter Comparison

| Comparable Samples | Fastener-A | Fastener 50 | Fastener-B | Fastener-C | Fastener-D | Fastener-E | Fastener-F |
|---|---|---|---|---|---|---|---|
| Product description | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Torsional Strength (lbf-in) | 181.42 | 175.28 | 133.34 | 174.1 | 222 | 132.78 | 124.9 |
| Torsional Strength (Nm) | 20.50 | 19.81 | 15.07 | 19.67 | 25.08 | 15.00 | 14.11 |
| Torsional strength (%)[1] | 104% | 100% | 76% | 99% | 127% | 76% | 71% |
| Root diameter (inch) | 0.1865 | 0.186 | 0.164 | 0.182 | 0.188 | 0.170 | 0.156 |
| Root diameter (mm) | 4.74 | 4.72 | 4.16 | 4.62 | 4.76 | 4.33 | 3.97 |
| Root diameter (%)[1] | 100% | 100% | 88% | 98% | 101% | 92% | 84% |
| Core hardness (HRC) | 38.4 | 37.0 | 40.2 | 39.9 | 42.3 | 37.1 | 40.6 |

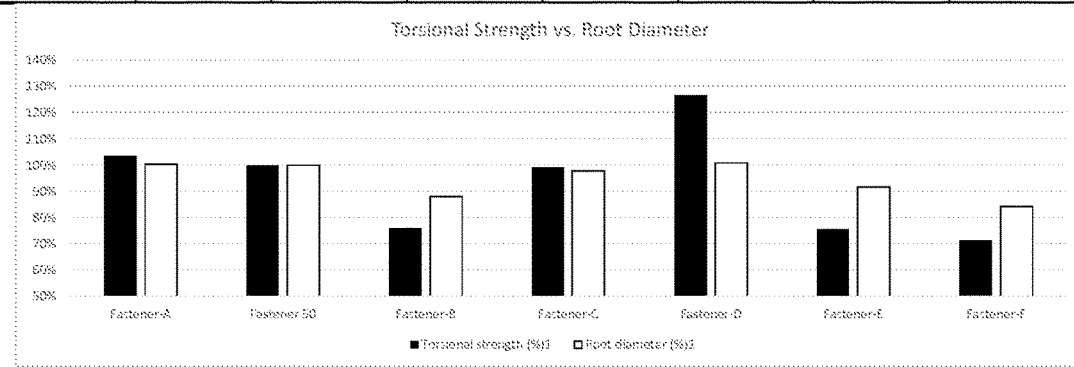

Notes:

1. Fastener 50 is used as a benchmark to compare torsional strength and root diameter to otain the percentage.

FIGURE 13  TABLE 5 - Self-Drilling Self-Tapping Fastener Tensile Strength vs Root Diameter Comparison

| Comparable Samples | Fastener-A | Fastener 50 | Fastener-B | Fastener-C | Fastener-D | Fastener-E | Fastener-F |
|---|---|---|---|---|---|---|---|
| Product description | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Tensile strength (lbf) | 4809 | 4803 | 3444 | 4779 | 4779 | 3964 | 4000 |
| Tensile strength (N) | 21,389 | 21,365 | 15,321 | 21,258 | 21,255 | 17,632 | 17,793 |
| Tensile strength (%)[1] | 100% | 100% | 72% | 100% | 99% | 83% | 83% |
| Root diameter (inch) | 0.1865 | 0.186 | 0.164 | 0.182 | 0.188 | 0.170 | 0.156 |
| Root diameter (mm) | 4.74 | 4.72 | 4.16 | 4.62 | 4.76 | 4.33 | 3.97 |
| Root diameter (%)[1] | 100% | 100% | 88% | 98% | 101% | 92% | 84% |

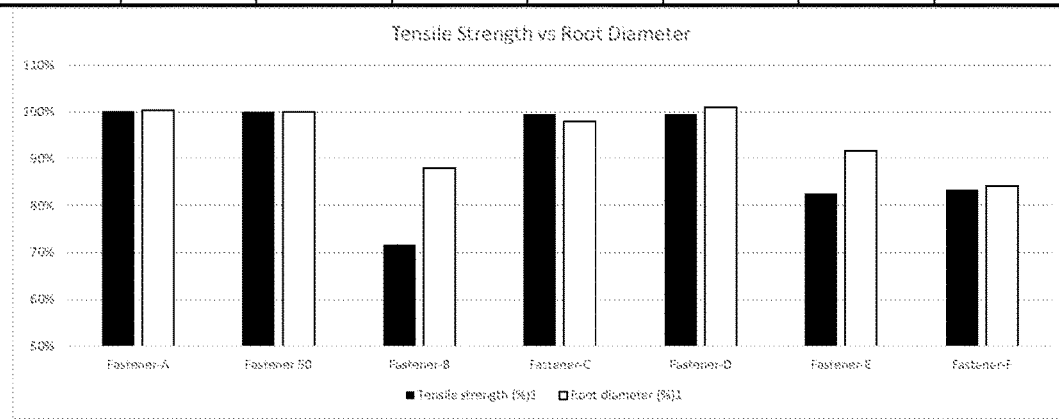

Notes:

1. Fastener 50 is used as a benchmark to compare each samples' tensile strength and root diameters to obtain the get the percentage.

FIGURE 14 TABLE 6 - Self-Drilling Self-Tapping Fastener Pullout vs. Thread Engagement Comparison

| Comparable Samples | Fastener-A | Fastener 50 | Fastener-B | Fastener-C | Fastener-D | Fastener-E | Fastener-F |
|---|---|---|---|---|---|---|---|
| Product description | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Pullout (from 3/16" steel) (lbf) | 3516 | 3614 | 3028 | 3196 | 3476 | 3060 | 2851 |
| Pullout (from 3/16" steel) (N) | 15,640 | 16,077 | 13,470 | 14,214 | 15,460 | 13,611 | 12,679 |
| Pullout % | 97% | 100% | 84% | 88% | 96% | 85% | 79% |
| Thread OD (inch) | 0.215 | 0.217 | 0.210 | 0.211 | 0.216 | 0.212 | 0.213 |
| Thread OD (mm) | 5.46 | 5.52 | 5.33 | 5.37 | 5.49 | 5.38 | 5.41 |
| Drill Point OD (inch) | 0.197 | 0.199 | 0.193 | 0.196 | 0.198 | 0.200 | 0.196 |
| Drill Point OD (mm) | 4.99 | 5.05 | 4.90 | 4.98 | 5.03 | 5.08 | 4.98 |
| Thread Engagement[1] (inch) | 0.0185 | 0.0183 | 0.0168 | 0.0153 | 0.0180 | 0.0120 | 0.0168 |
| Point eccentricity (inch) | 0.0265 | 0.0023 | 0.0219 | 0.0010 | 0.0065 | 0.0318 | 0.0113 |
| Thread Engagement (mm) | 0.47 | 0.46 | 0.43 | 0.39 | 0.46 | 0.30 | 0.43 |
| Thread Engagement % | 101% | 100% | 92% | 83% | 98% | 66% | 92% |

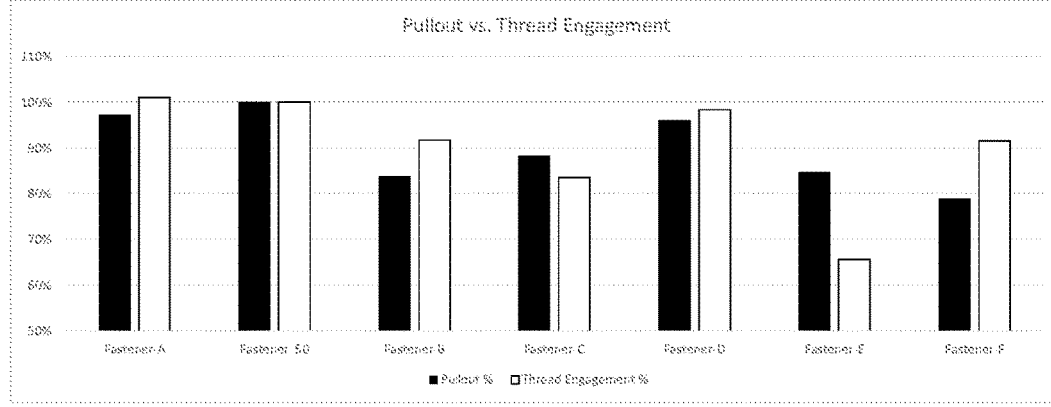

Notes:

1. Thread Engagement equals the Thread OD minus the Drill Point OD.

2. Fastener 50 is used as a benchmark to compare each sample's Pullout Force and Thread Engagement to obtain the percentage.

FIGURE 15  TABLE 7 - Self-Drilling Self-Tapping Fastener Drilling-time/Tapping-torque vs. Geometry Comparison

| Comparable Samples | Fastener-A | Fastener 50 | Fastener-B | Fastener-C | Fastener-D | Fastener-E | Fastener-F |
|---|---|---|---|---|---|---|---|
| Product description | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS | 12-24x1-1/4" HWH #5 SDS |
| Point manufacturing method | Milled | Forged | Forged | Forged | Forged | Forged | Forged |
| Special features at point | - | Chip breaker | - | Chip breaker | - | Chip breaker | - |
| Point OD (inch) | 0.197 | 0.199 | 0.193 | 0.196 | 0.198 | 0.200 | 0.196 |
| Point cutting edge angle | 135.5 | 110.6 | 110.6 | 111.1 | 103.9 | 112.0 | 107.4 |
| Cutting edge web thickness (inch) | 0.007 | 0.013 | 0.024 | 0.008 | 0.028 | 0.011 | 0.012 |
| Cutting edge center distance (inch) | -0.022 | 0.005 | 0.014 | 0.002 | 0.002 | 0.008 | 0.001 |
| Thread member at flute transition | 4 | 3 | 5 | 3 | 6 | 0 | 4 |
| Other thread features | - | - | 3 grooves | - | 3 grooves | - | - |
| Drilling time (second, 1/2" steel) | 21.85 | 11.92 | 16.89 | 18.10 | 22.99 | 18.93 | 16.40 |
| Thread Engagement[1] (inch) | 0.0185 | 0.0183 | 0.0168 | 0.0153 | 0.0180 | 0.0120 | 0.0168 |
| Thread Engagement % | 101% | 100% | 92% | 83% | 98% | 66% | 92% |
| % of Drilling time (1/2" steel) | 183% | 100% | 142% | 152% | 193% | 159% | 138% |
| Tapping torque (lbf-in, 1/2" steel) | 49.95 | 32.95 | 47.6 | 28.3 | 51.8 | 18.2 | 25.2 |
| % of Tapping torque (1/2" steel) | 152% | 100% | 144% | 86% | 157% | 55% | 76% |
| Drilling time (second, 3/8" steel) | 13.91 | 7.51 | 9.02 | 9.70 | 8.53 | 12.78 | 10.71 |
| % of Drilling time (3/8" steel) | 185% | 100% | 120% | 129% | 114% | 170% | 143% |
| Tapping torque (lbf-in, 3/8" steel) | 38.4 | 31.9 | 45.6 | 22.8 | 42.9 | 17.9 | 22.8 |
| % of Tapping torque (3/8" steel) | 120% | 100% | 143% | 71% | 134% | 56% | 71% |

Notes:

1. Thread Engagement equals to Thread OD minus Drill Point OD.

2. Fastener 50 is used as a benchmark to compare each other samples' Drilling time and Tapping Torque to obtain the percentage.

3. Drilling test conditions: end-load = 60 lbf, drilling speed = 1700 rpm, substrate is A36 steel plate (3/8" thick or 1/2" thick). Tested 20 samples of each comparable.

US 12,000,421 B2

SELF-DRILLING SELF-TAPPING FASTENER

PRIORITY

This application claims priority to and the benefit of U.S. Provisional Patent Application Ser. No. 63/134,785, filed Jan. 7, 2021, the entire contents of which are incorporated herein by reference.

BACKGROUND

Fasteners are well known and widely used throughout the world to secure one object to another object. Various known fasteners include: (a) a head including a mechanical engaging structure engageable by a tool, (b) a shank extending from the head, and (c) a helical thread formation outwardly extending from the shank for frictionally engaging the objects into which the fastener is driven. Certain known self-drilling self-tapping fasteners have a shank that also includes a drill tip and at least one flute. The drill tip and the flute(s) enable the self-drilling self-tapping fastener to form holes in the objects into which the fastener is driven.

There is a continuing need for self-drilling self-tapping fasteners that have improvements to performance in one or more of the following categories without decreasing performance in any of the other categories: (i) drilling times; (ii) ductility; (iii) tapping torque; (iv) torsional strength; (v) tensile strength; and (vi) pullout force.

SUMMARY

The present disclosure provides a self-drilling self-tapping fastener that has: (1) an improved performance in drilling time and specifically a relatively lower drilling time, and (2) improved performance in pullout force and specifically a relatively higher pullout force, both without decreasing performance in any of the ductility, the tapping torque, the torsional strength, and the tension strength of such self-drilling self-tapping fastener.

In various embodiments of the present disclosure, the self-drilling self-tapping fastener includes a head, a shank integrally connected to and extending from the head and including a first shank portion and a second shank portion, and a helical thread formation integrally connected to and extending radially outwardly from the first shank portion and part of the second shank portion. The second shank portion defines a longitudinally extending first flute and a longitudinally extending second flute. The first flute extends through three threads of the thread formation on a first side of the second shank portion The second flute extends through three threads of the thread formation on a second side of the second shank portion and to a fourth thread formation on the second side of the second shank portion. The second shank portion includes a first chip breaker positioned in the first flute and a second chip breaker positioned in the second flute. The second shank portion includes a drill tip. The drill tip includes a first cutting blade having a first cutting edge and a second cutting blade having a second cutting edge. The first cutting edge and the second cutting edge are tapered toward each other. The second shank portion is suitably formed such as by milling or forging in various different embodiments of the present disclosure. The head, the shank, and the helical thread formation are specifically configured and sized such that the self-drilling self-tapping fastener has improved performance in drilling time and pullout force without decreased performance in any of the ductility, the tapping torque, the torsional strength, and the tension strength of the self-drilling self-tapping fastener.

Other objects, features, and advantages of the present disclosure will be apparent from the following detailed disclosure and accompanying drawings.

BRIEF DESCRIPTION OF THE FIGURES

FIG. 3 is a second side view of the self-drilling self-tapping fastener of FIG. 1, with the self-drilling self-tapping fastener rotated 180 degrees from FIG. 2.

FIG. 7 is a top end view of the self-drilling self-tapping fastener of FIG. 1.

FIG. 9 is Table 1 showing a general parameter comparison of the self-drilling self-tapping fastener of FIG. 1 and six example commercially available self-drilling self-tapping fasteners.

FIG. 10 is Table 2 showing a dimensional comparison of the self-drilling self-tapping fastener of FIG. 1 and six example commercially available self-drilling self-tapping fasteners.

FIG. 11 is Table 3 showing ductility test results vs core hardness for the self-drilling self-tapping fastener of FIG. 1 in comparison to six example commercially available self-drilling self-tapping fasteners.

FIG. 12 is Table 4 showing torsional strength vs root diameter test results for the self-drilling self-tapping fastener of FIG. 1 in comparison to six example commercially available self-drilling self-tapping fasteners.

FIG. 13 is Table 5 showing tensile strength vs root diameter test results for the self-drilling self-tapping fastener of FIG. 1 in comparison to six example commercially available self-drilling self-tapping fasteners.

FIG. 14 is Table 6 showing pullout force vs thread engagement test results for the self-drilling self-tapping fastener of FIG. 1 in comparison to six example commercially available self-drilling self-tapping fasteners.

FIG. 15 is Table 7 showing drilling time/tapping torque vs point geometry test results for the self-drilling self-tapping fastener of FIG. 1 in comparison to six example commercially available self-drilling self-tapping fasteners.

DETAILED DESCRIPTION

Figure 1:
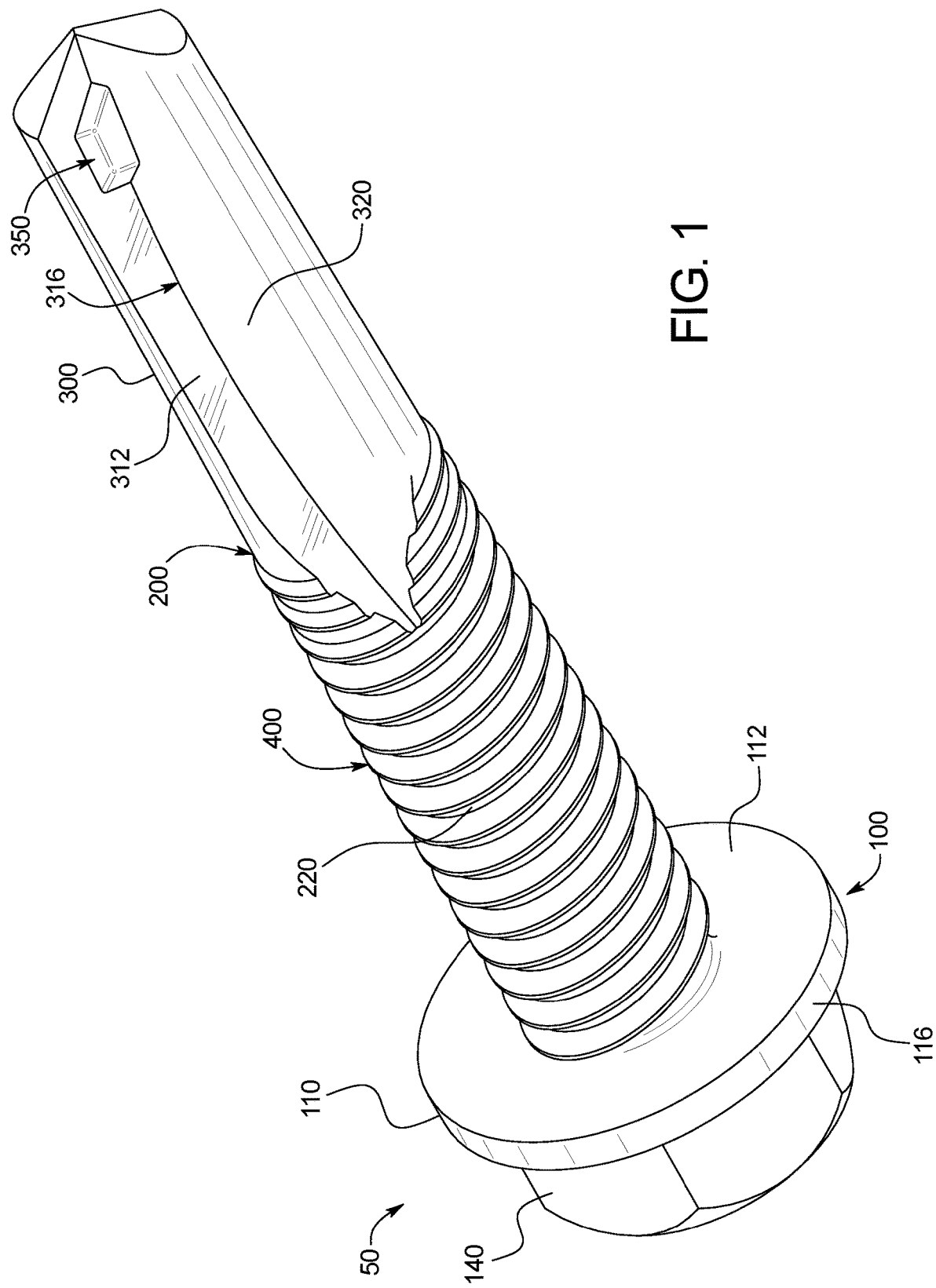
FIG. 1 is a side perspective view of one example embodiment of a self-drilling self-tapping fastener of the present disclosure.

While the systems, devices, and methods described herein may be embodied in various forms, the drawings show and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Turning now to the drawings, FIGS. 1, 2, 2A, 2B, 3, 3A, 3B, 4, 4A, 5, 6, 6A, 7, and 8 illustrate one example embodiment of the self-drilling self-tapping fastener of the present disclosure, generally indicated by numeral 50 and sometimes called the "fastener" herein for brevity. FIGS. 9 and 10 show tables comparing the features and dimensions of the self-drilling self-tapping fastener 50 to six example commercially available self-drilling fasteners. FIGS. 11, 12, 13, 14, and 15 show tables comparing various tests results on the self-drilling self-tapping fastener 50 to these same six example commercially available self-drilling self-tapping fasteners.

Various embodiments of the example fastener 50 are particularly configured for use in connecting steel objects (such as but not limited to connecting a ⅛ inch (0.315 cms) steel plate to a ¼ inch (0.635 cms) steel plate). However, the fastener may be employed for a variety of different uses in accordance with the present disclosure. In this example, fastener 50 is a #12-24×1¼ inch fastener. It should be appreciated that the fastener length may vary in other alternative embodiments of the present disclosure as further discussed below.

Figure 3A:
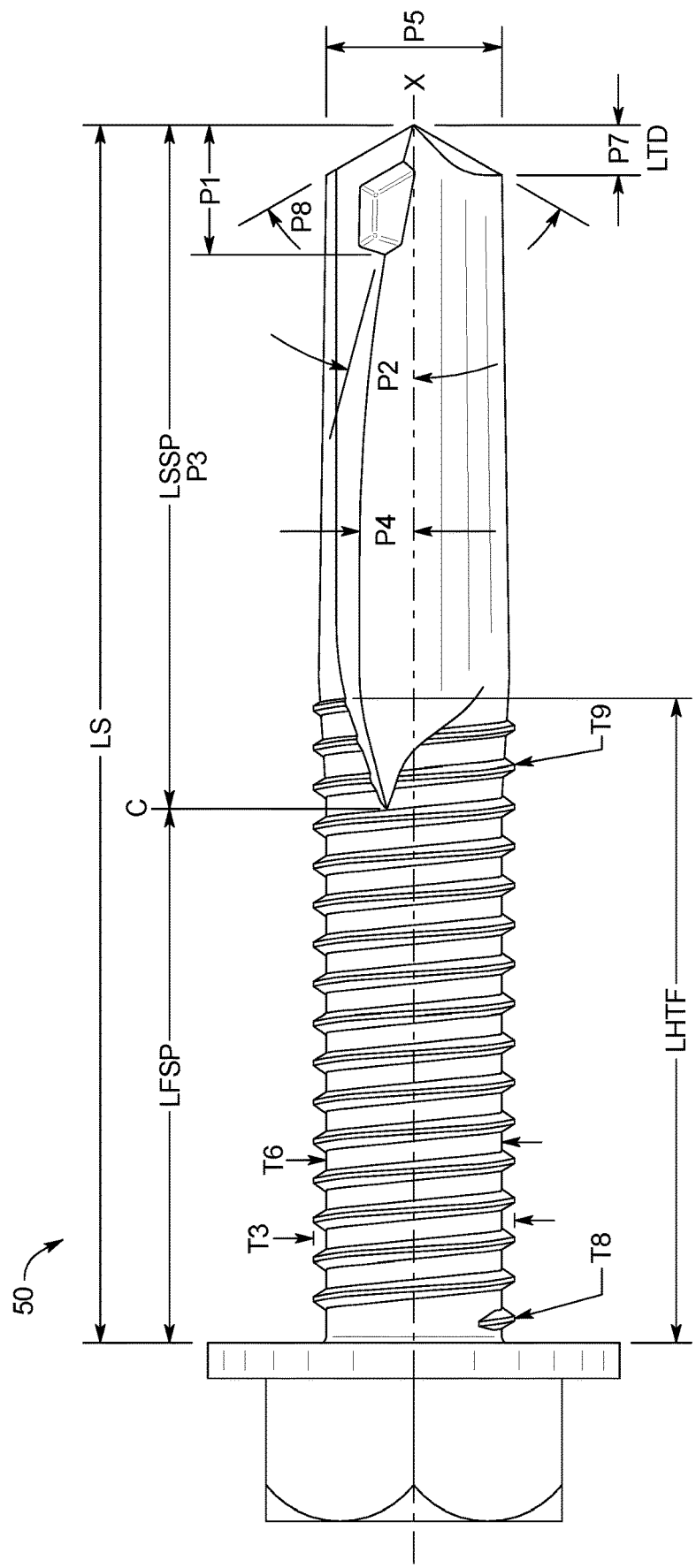
FIG. 3A is also a second side view of the self-drilling self-tapping fastener of FIG. 1, identical to FIG. 3 but with dimensional indicators.

The fastener 50 has a longitudinal central axis X and includes: (a) a head 100; (b) a shank 200 integrally connected at one end to the head 100; and (c) a helical thread formation 400 integrally connected to and extending outwardly from parts of the shank 200. The shank 200 includes a first shank portion 220 integrally connected to and extending from the head 100, and a second shank portion 300 integrally connected to and extending from the first shank portion 220 opposite the head 100. Line C in FIG. 3A illustrates the plane along which the first shank portion 220 is integrally connected to the second shank portion 300 in this example embodiment. The second shank portion 300 functions as the drilling portion of the shank 200 and enables the fastener 50 to be used to drill a hole in one or more objects into which the fastener 50 will be tapped, fastened and secured.

In this example embodiment, the head 100, the shank 200, and the thread formation 400 are monolithically formed. More specifically, in this example embodiment, the fastener 50 is made by: (1) cutting (or otherwise forming) a carbon steel member (not shown but further described below) that is sometimes initially called a blank having a suitable length and a suitable width; (2) then forming (such as by forging) the carbon steel member to form the head 100; (3) then forming (such as by forging or milling) the carbon steel member to form the second shank portion 300; (4) then forming (such as by roll threading) the carbon steel member to form the thread formation 400; (5) then heat treating the carbon steel member; and (6) then coating the carbon steel member with a suitable corrosion resistance coating and curing this coating on the carbon steel member. It should be appreciated that one or more suitable cleaning and/or deburring processes may be employed in accordance with the present disclosure to form the fastener 50.

It should be appreciated that the self-drilling self-tapping fastener 50 of this example embodiment is made from a low carbon steel (such as but not limited to an AISI 1022 low carbon steel). It should be also be appreciated that the heat treatment of case hardening is to provide a hardened fastener surface, so that the fastener point can self-drill into steel objects, and the thread formation can self-tap its own way to engage with steel objects. It should further be appreciated that hardened fastener surface case depth should be maintained in a reasonable range because if the case depth is too deep, it can make the fastener too brittle. It should also be appreciated that the case hardening process also provides a lower fastener core hardness, which ensures that the fastener has enough ductility. If the core hardness is too high, it will make the fastener too brittle, and become vulnerable to hydrogen embrittlement failure and/or hydrogen assisted stress corrosion. It should further be appreciated that the fastener's coating not only provides corrosion protection, but also provides lubrication when the fastener drills into one or more steel objects.

The head 100 includes a generally annular bottom portion 110 and a top portion 140 integrally connected to the bottom portion 110. The annular bottom portion 110 has an outer diameter of 0.412 inches (1.04648 cms) and a height of 0.035 inches (0.0889 cms). The annular bottom portion 110 has a bottom surface 112, a top surface 114, and a generally cylindrical outer edge 116 extending from and connect the bottom surface 112 to the top surface 114. The outer edge 116 is somewhat rounded or convex along its entire surface. The bottom portion 110 is also integrally connected to the first shank portion 220. In this example embodiment, as best shown in FIG. 7, the top portion 140 of the head 100 defines an external hexagonal mechanical engaging structure having six sides 142a, 142b, 142c, 142d, 142e, and 142f that define an upper recessed portion 150. The six sides 142a, 142b, 142c, 142d, 142e, and 142f are engageable by an appropriate wrench or hex socket (not shown) configured to rotate and drive the self-drilling self-tapping fastener 50. It should be appreciated that other suitable mechanical engaging structures (not shown) may be employed in accordance with the present disclosure, such as but not limited to: (1) a straight slot (engageable by a flathead screwdriver), (2) a cross-shaped slot (engageable by a Phillips head screwdriver), (3)

an internal star or six lobe shaped cavity (engageable by a six lobe driver), or (4) an internal hexagonal shaped cavity (engageable by an Allen wrench). As also best shown in FIG. 7, the top portion 140 of the head 100 has six corners 144a, 144b, 144c, 144d, 144e, and 144f, respectively between sides 142a and 142b, 142b and 142c, 142c and 142d, 142d and 142e, 142e and 142f, and 142f and 142a.

In this example embodiment, the top portion 140 of the head 100 has a height of 0.150 inches (0.381 cms). The top portion 140 has an outer diameter of 0.306 inches (0.77724 cms) from side 142a to side 142d, from side 142b to side 142e, and from side 142c to side 142f. The top portion 140 has an outer diameter of 0.351 inches (0.89154 cms) from corner 144a to corner 144d, from corner 144b to corner 144e, and from corner 144c to corner 144f.

The shank 200 has a length (LS) indicated in FIG. 3A, which in this example embodiment is 1.245 inches (3.162 cms), and includes: (1) the first shank portion 220; and (2) the second shank portion 300.

The first shank portion 220 is integrally connected to the head 100 at an inner end 222 and is integrally connected to the second shank portion 300 at an outer end 226. The first shank portion 220 is annular and has a constant outer diameter (OD) from the inner end 222 (adjacent to the head 100) to the outer end 226 (adjacent to the second shank portion 300). This outer diameter in this example embodiment is 0.214 inches (0.544 cms). The first shank portion 220 has a length (LFSP) as indicated in FIG. 3A and which in this example embodiment is 0.632 inches (1.605 cms).

The second shank portion 300 includes an inner end 302 that is integrally connected to the first shank portion 220 and an outer end 306. The outer end 306 is a free end and includes a drill tip 380 as described below. The second shank portion 300 is configured to enable the fastener 50 to be self-drilling. In particular, the second shank portion 300: (1) defines a longitudinally extending first flute 310 (best seen in FIGS. 1, 2, 2A, 2B, and 8); (2) defines a longitudinally extending second flute 330 (best seen in FIGS. 3, 3A, 3B, and 8); (3) includes a first chip breaker 350 (best seen in FIGS. 1, 2, 2A, 2B, and 8); (4) includes a second chip breaker 370 (best seen in FIGS. 3, 3A, 3B, and 8); and (5) includes the drill tip 380.

The second shank portion 300 is partially annular and has multiple different outer surfaces and outer diameters, as further described below. In this example embodiment, the second shank portion 300 has a length (LSSP) indicated in FIG. 3A, and which in this example embodiment is 0.711 inches (1.806 cms). When viewed from the side shown in FIGS. 1, 2, 2A, and 2b, and the side shown in FIGS. 3, 3A, and 3B, the second shank portion 300 has a first constant outer diameter until reaching the drill tip 380. When viewed from the side shown in FIGS. 4 and 4A, and the side shown in FIG. 5, the second shank portion 300 has a first decreasing outer width, until reaching the drill tip 380. This decreasing outer width first decreases as at a greater angle and then decreases at a smaller angle. The elongated opposite outer surfaces 301 and 303 of the second shank portion 300 are rounded or convex and extend between the respective opposite flutes 310 and 330.

The first flute 310 defined in the second shank portion 300 includes a longitudinally extending first surface 312 and a longitudinally extending second surface 320. The longitudinally extending first surface 312 and the longitudinally extending second surface 320 meet along a longitudinally extending connection line 318 (best seen in FIGS. 2, 2A, 2B, and 8). The first flute 310 narrows almost to a point at the first end 302 of the second shank portion 300, widens toward the central section (not labeled) of the second shank portion 300, and remains wide through the drill tip 380 to the second end 306 of the second shank portion 300 (as best seen in FIGS. 1, 2, 2A, and 2B).

Figure 3B:
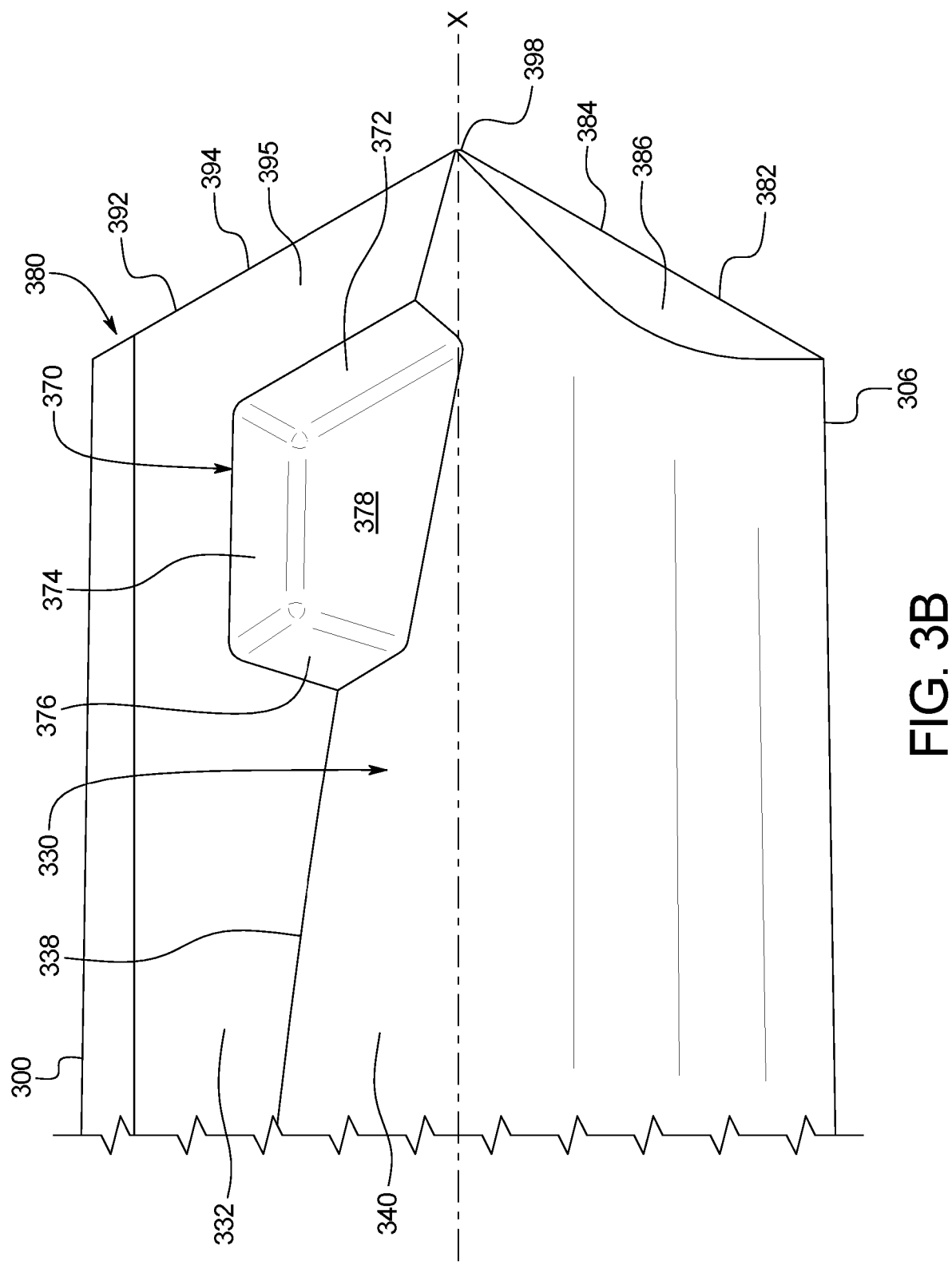
FIG. 3B is an enlarged fragmentary second side view of the end part of the second shank portion of the self-drilling self-tapping fastener of FIG. 1.

Likewise, the second flute 330 defined in the second shank portion 300 includes a longitudinally extending first surface 332 and a longitudinally extending second surface 340. The longitudinally extending first surface 332 and the longitudinally extending second surface 340 meet along a longitudinally extending connection line 338 (best seen in FIGS. 3, 3A, 3B, and 8). The second flute 330 narrows almost to a point at the first end 302 of the second shank portion 300, widens toward the central section (not labeled) of the second shank portion 300, and remains wide through the drill tip 380 to the second end 306 of the second shank portion 300 (as best seen in FIGS. 3, 3A, and 3B).

The first and second flutes 310 and 330 provide part of the self-drilling functionality of the fastener 50, and particularly provide areas for the debris cut by the drill tip 380 and the chip breakers 350 and 370 to move along the length of the shank 200 of the fastener 50 and out of the hole(s) being formed by the fastener 50 in the objects to which the fastener will be tapped, fastened, and secured.

For each flute 310 and 330, the flute length in this example embodiment is 0.141 inches (0.35814 cms). This is indicated by the P1 indications on FIGS. 2A and 3A and on Table 2 (FIG. 10). It should be appreciated that this length is 0.060 inches (0.1524 cms) longer than the flute length of example Fastener-A as shown in FIG. 10. This longer flute length in part enables the fastener 50 to be drilled through one or more thicker objects.

For each flute 310 and 330, the flute angle in this example embodiment is 13.6 degrees at one or more designated points along each respective flute. This is indicated by the P2 indications on FIGS. 2A and 3A and on Table 2 (FIG. 10).

For each flute 310 and 330, the flute relief length in this example embodiment is 0.711 inches (1.80594 cms). This is indicated by the P3 indication on FIG. 2A and on Table 2 (FIG. 10).

Figure 2:
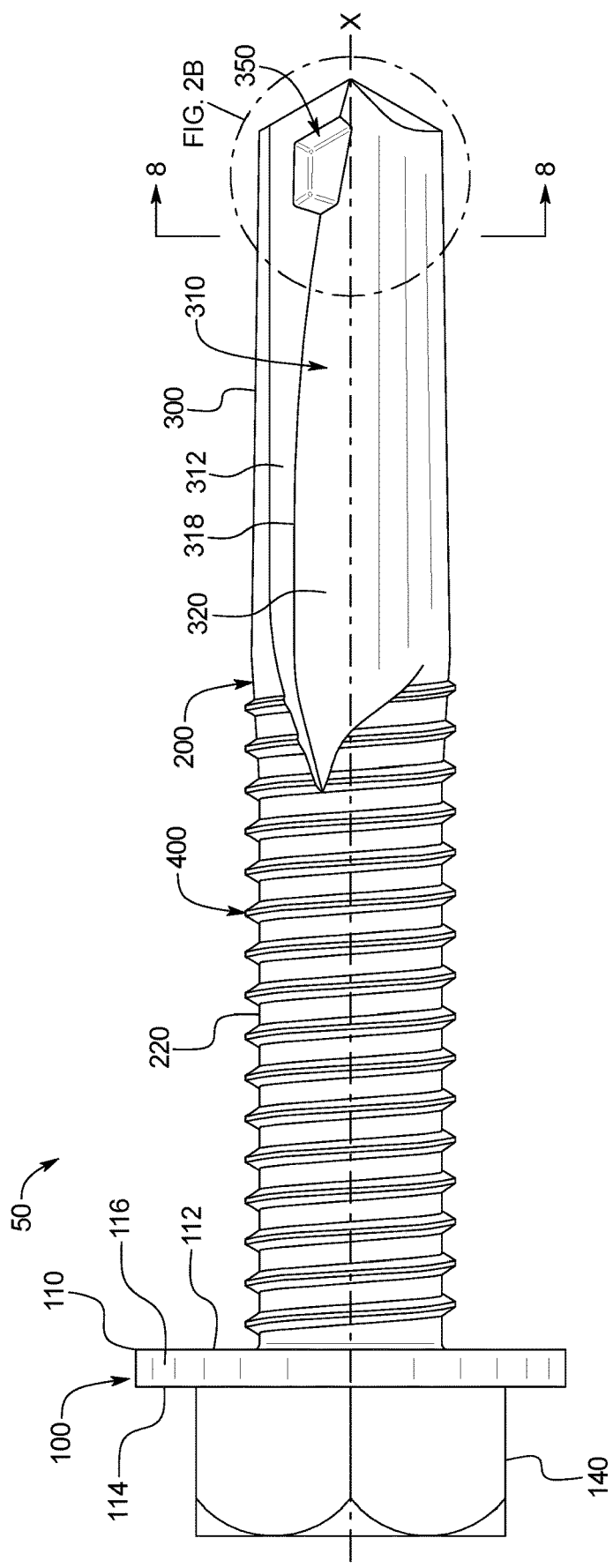
FIG. 2 is a first side view of the self-drilling self-tapping fastener of FIG. 1.
Figure 2A:
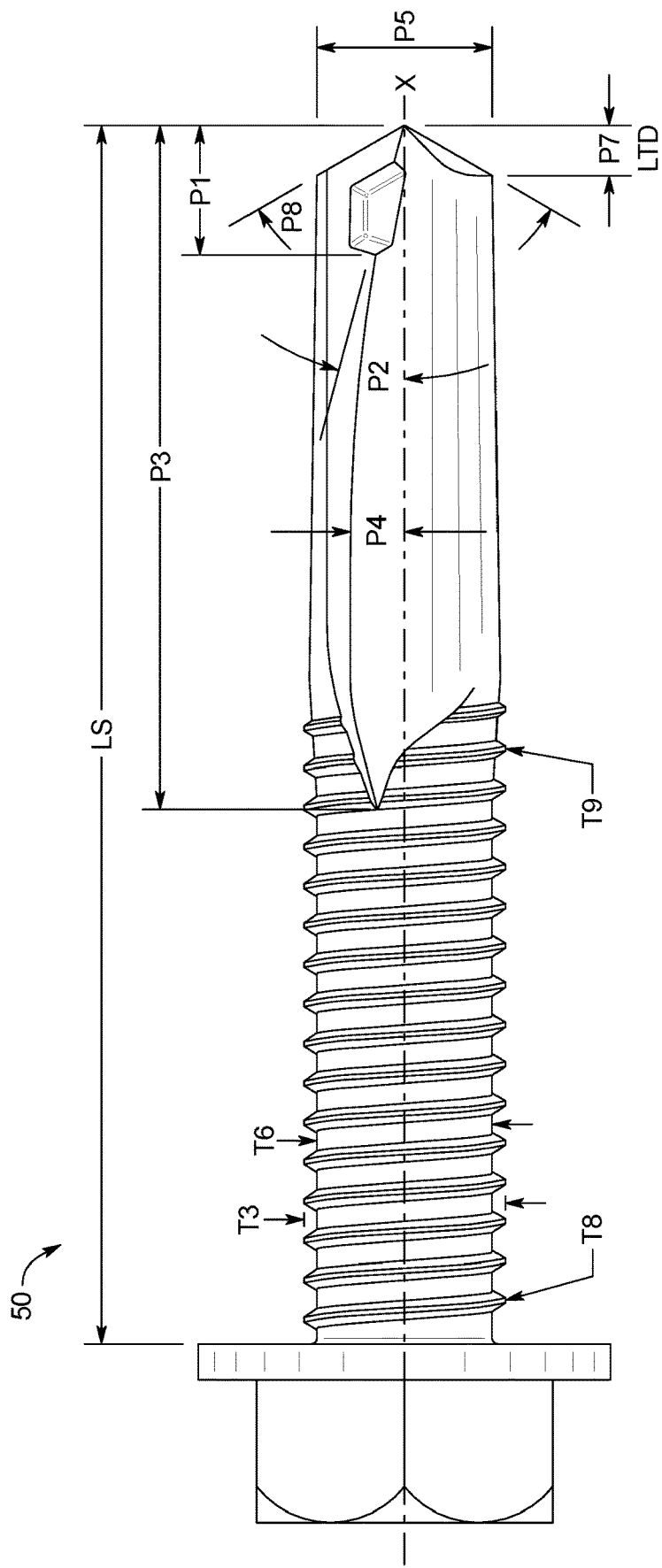
FIG. 2A is also a first side view of the self-drilling self-tapping fastener of FIG. 1, identical to FIG. 2 but with dimensional indicators.
Figure 2B:
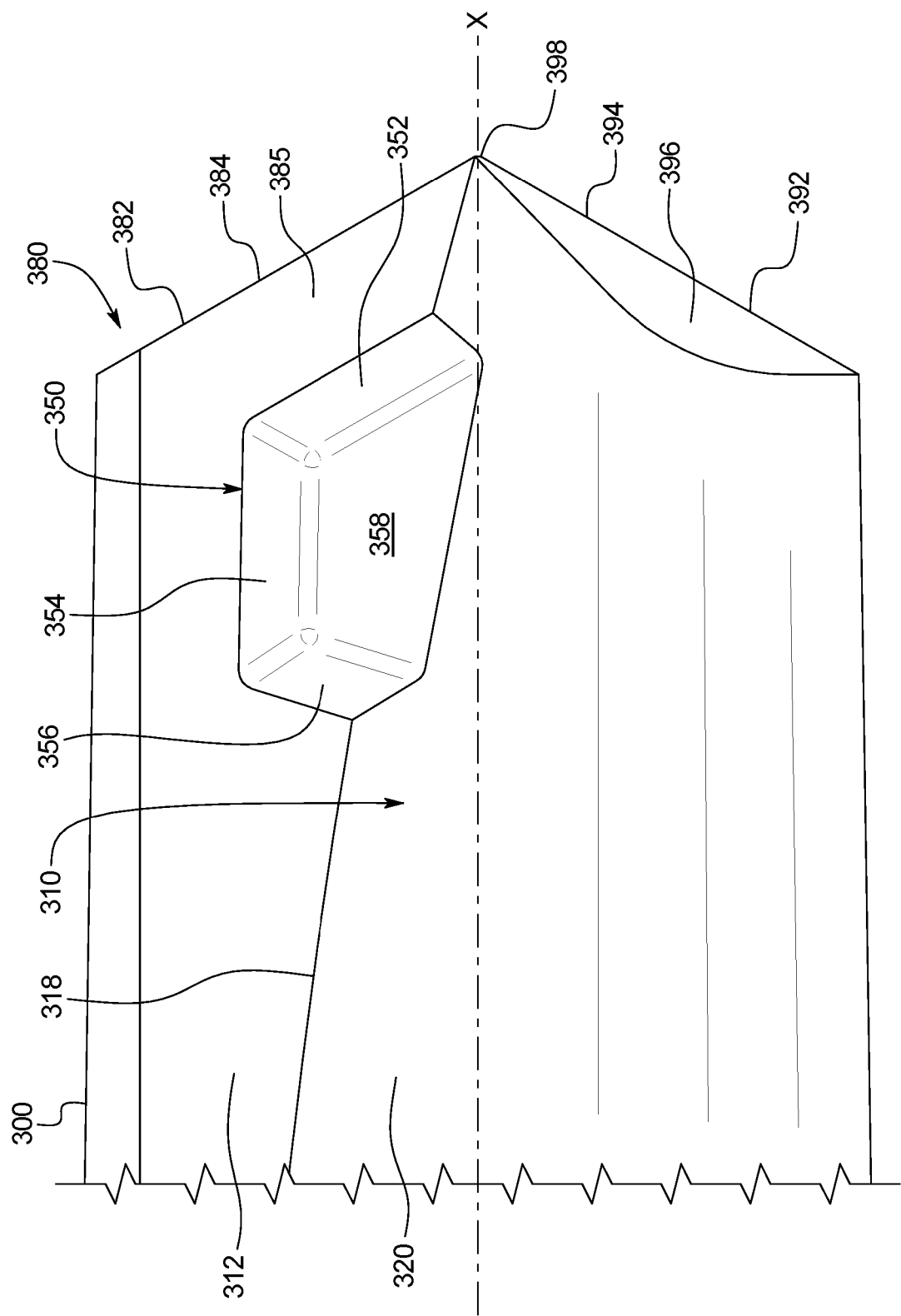
FIG. 2B is an enlarged fragmentary first side view of the free end part of the second shank portion of the self-drilling self-tapping fastener of FIG. 1.

As best shown in FIG. 2B, the first chip breaker 350 of the second shank portion 300 includes first, second, third, and fourth connected surfaces 352, 354, 356, and 358 positioned in the flute 330 adjacent the second end 306 of the second shank portion 300. Likewise, as best shown in FIG. 3B, the second chip breaker 370 of the second shank portion 300 includes first, second, third, and fourth connected surfaces 372, 374, 376, and 378 positioned in the flute 360 adjacent the second end 306 of the second shank portion 300. These chip breakers 350 and 370 of the second shank portion 300 reduce tapping torque by cutting chips into smaller pieces from the object(s) that the fastener 50 is/are tapping into, which in turn reduces jamming. The chip breakers 350 and 370 thus provide part of the self-drilling functionality of the fastener 50, and particularly function with the drill tip 380 to form the hole(s) in the object(s) being formed by the fastener 50 in the object(s) to which the fastener will be tapped, fastened, and secured.

Figure 4:
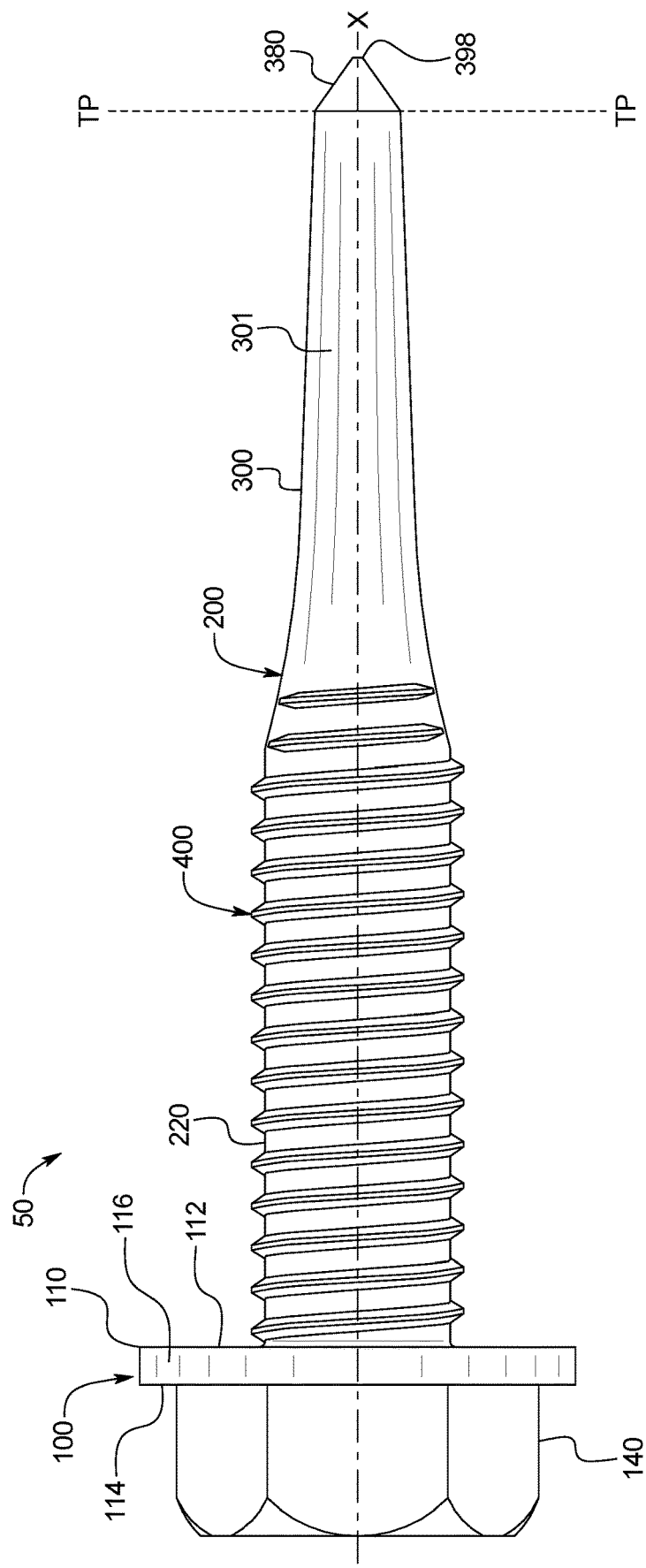
FIG. 4 is a third side view of the self-drilling self-tapping fastener of FIG. 1, with the self-drilling self-tapping fastener rotated 90 degrees in a first direction from FIG. 2.
Figure 4A:
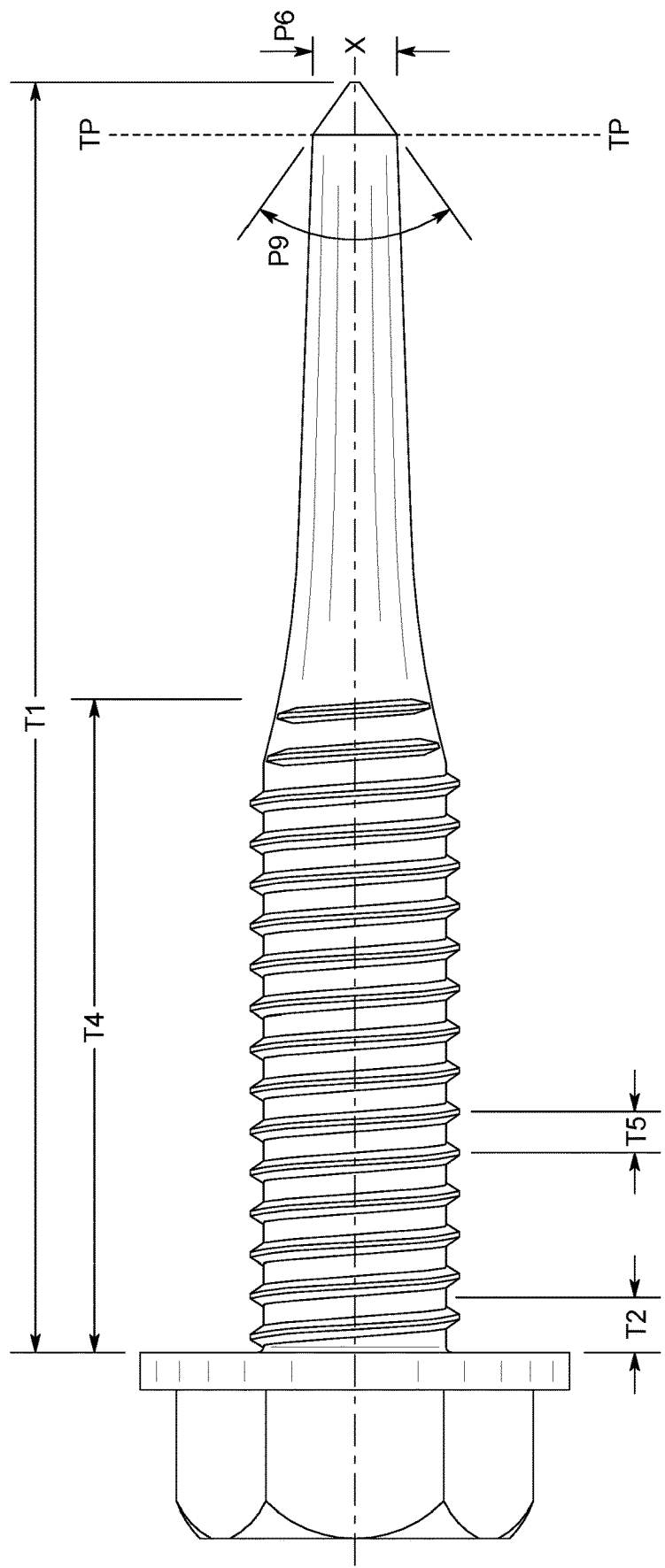
FIG. 4A is also a third side view of the self-drilling self-tapping fastener of FIG. 1, identical to FIG. 4 but with dimensional indicators.
Figure 5:
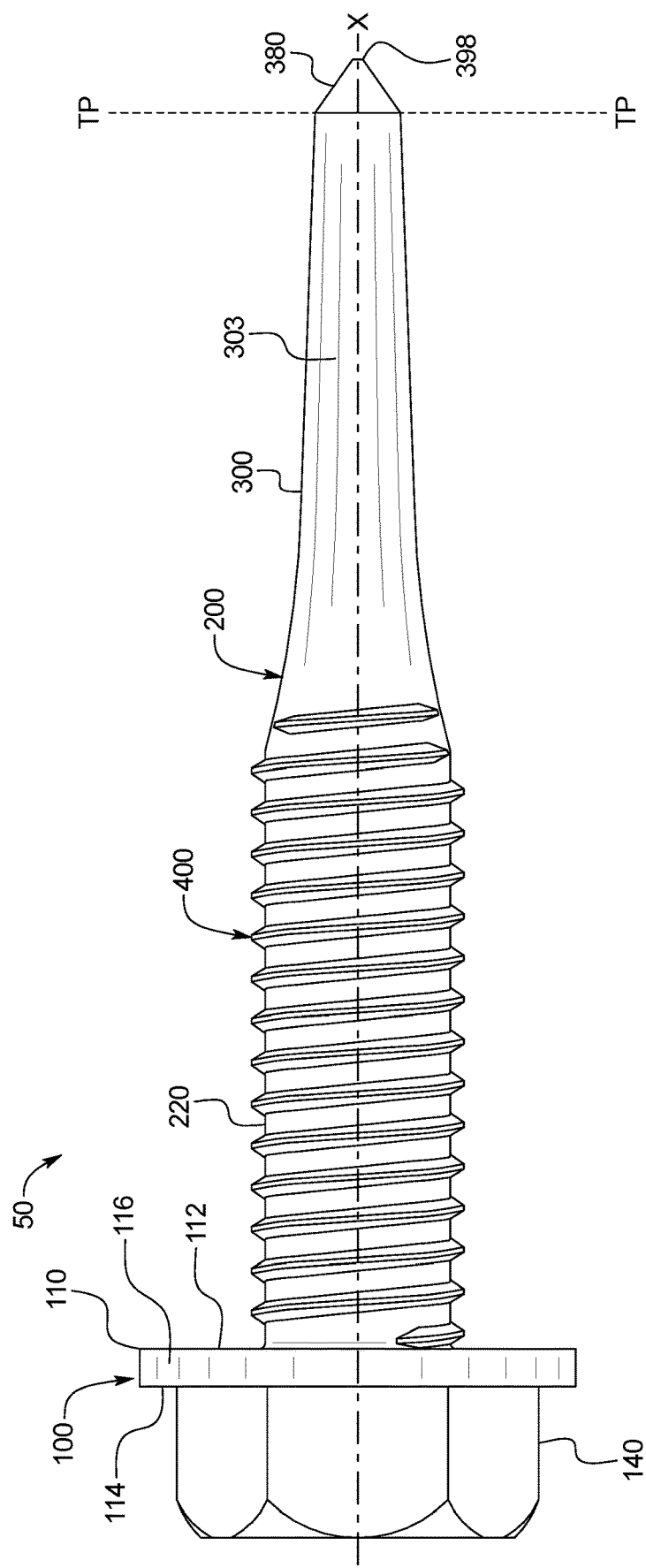
FIG. 5 is a fourth side view of the self-drilling self-tapping fastener of FIG. 1, with the self-drilling self-tapping fastener rotated 90 degrees is an opposite second direction from FIG. 2, and rotated 180 degrees from FIG. 4.
Figure 6:
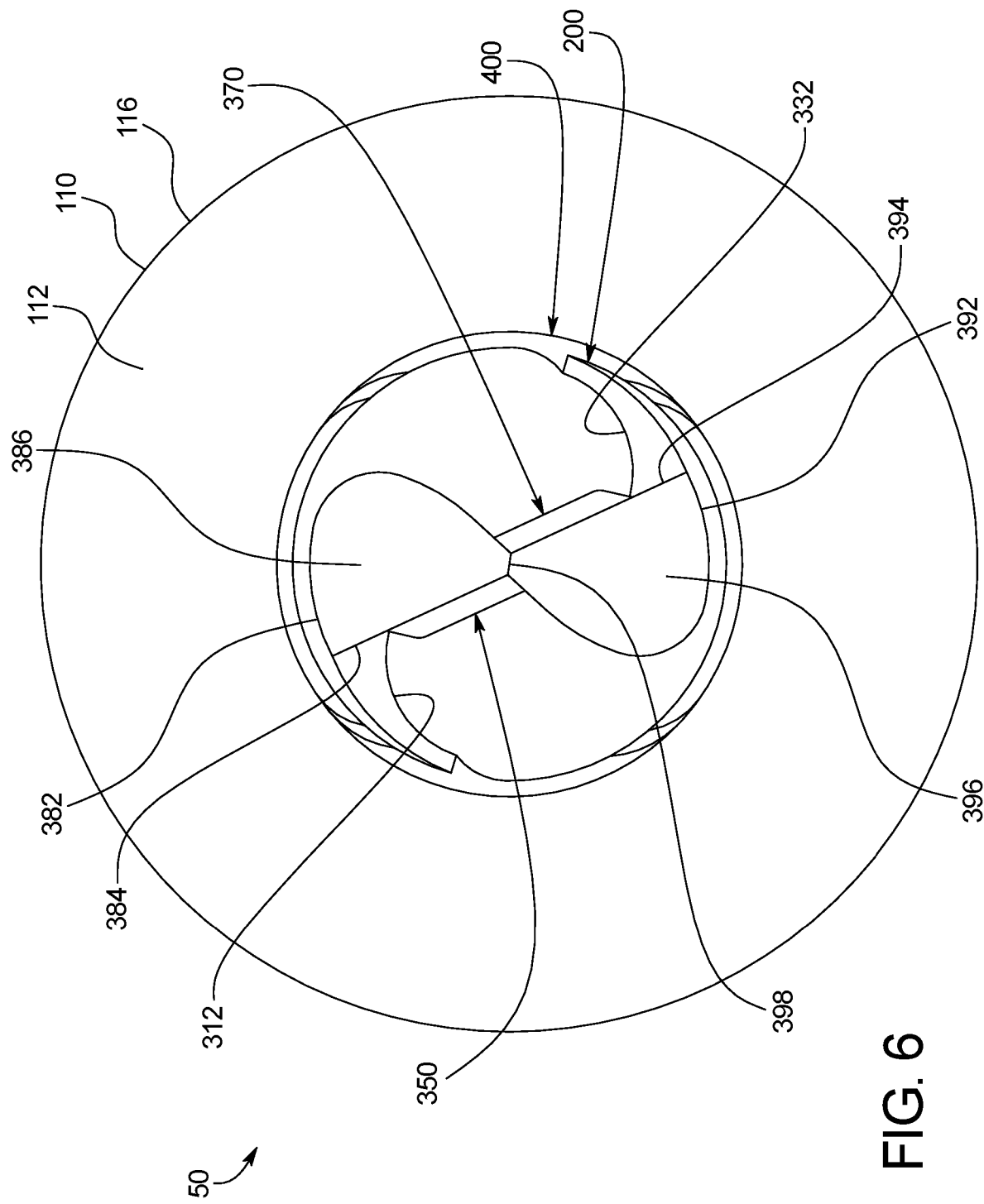
FIG. 6 is a bottom end view of the self-drilling self-tapping fastener of FIG. 1.
Figure 6A:
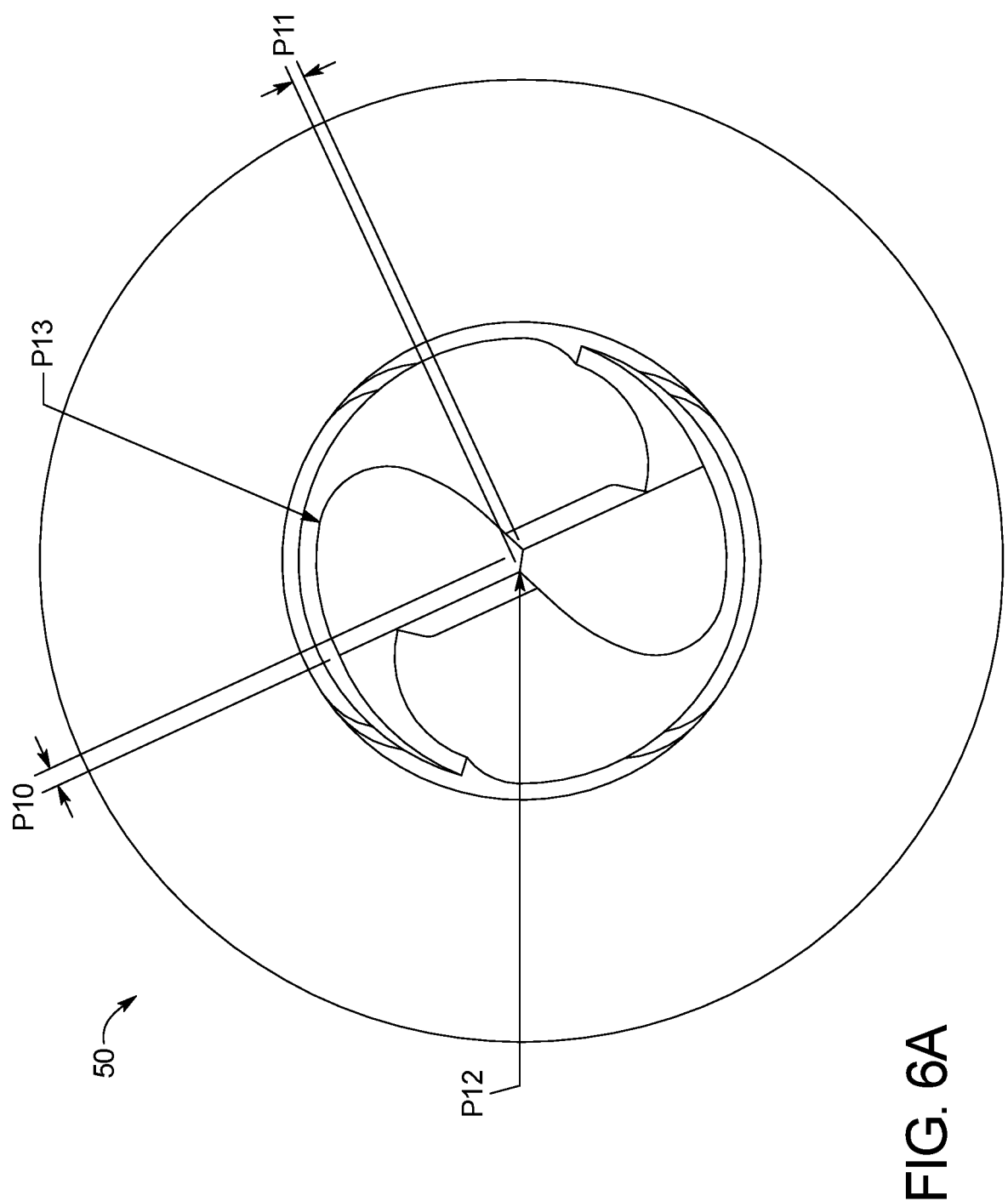
FIG. 6A is also bottom end view of the self-drilling self-tapping fastener of FIG. 1, identical to FIG. 6 but with dimensional indicators.
Figure 8:
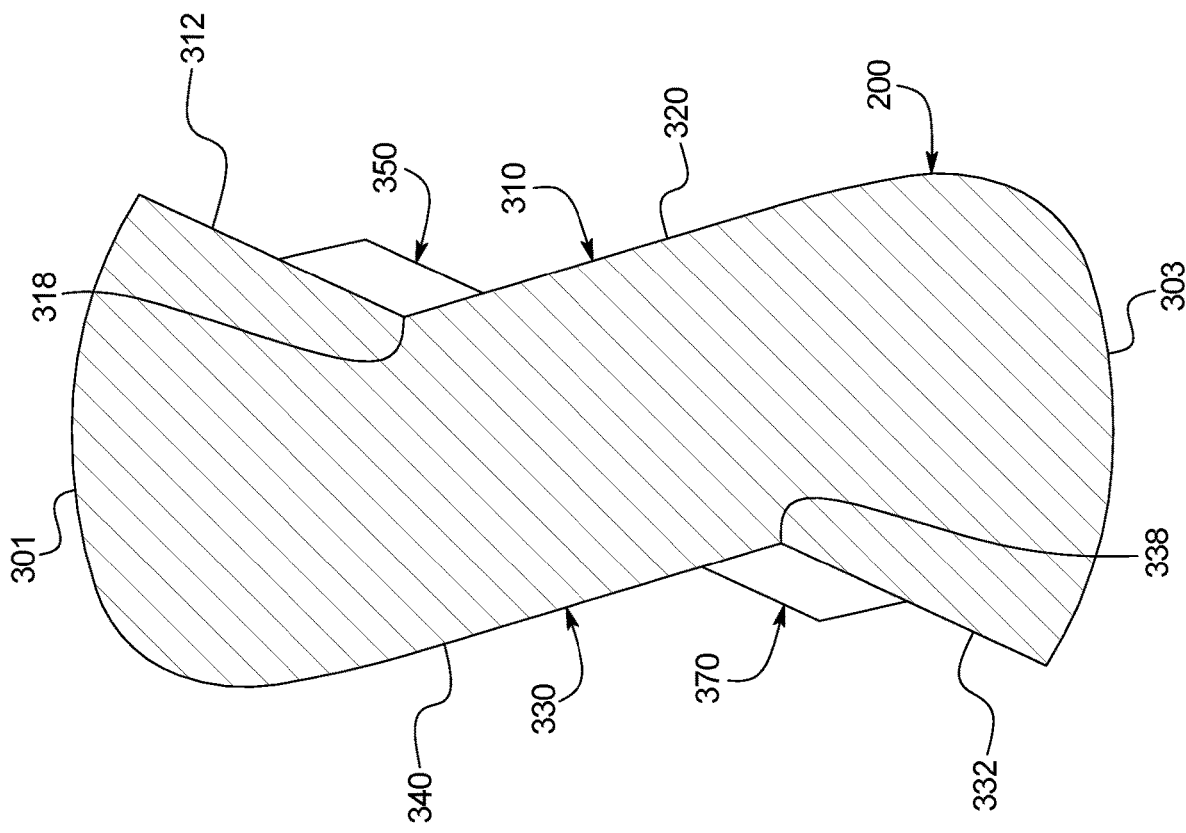
FIG. 8 is a fragmentary cross-sectional view of part of the self-drilling self-tapping fastener of FIG. 1 taken substantially along line 8-8 of FIG. 2.

The drill tip 380 of the second shank portion 300 extends from a transition plane indicated by dotted reference line TP shown in FIGS. 4, 4A, and 5 to the drill tip point 398. The drill tip 380 has a length (LDT) or point height P7 indicated in FIGS. 2A and 3A and on Table 2 (FIG. 10) which in this example embodiment is 0.060 inches (0.1524 cms).

As best shown in FIGS. 2, 2A, 2B, 3, 3A, and 3B, the drill tip 380 includes: (1) a first cutting blade 382 having a first cutting edge 384, a first cutting surface 385, and an outer surface 386; and (2) a second cutting blade 392 having a second cutting edge 394, a first cutting surface 395, and an outer surface 396. The first cutting blade 382 and the second cutting blade 392 are tapered toward each other and specifically the first cutting edge 384 and the second cutting edge 394 are tapered toward each other.

The outer diameter of the drill tip 380 decreases moving along the longitudinal axis X in the direction of or toward the pointed end 398 from: (1) a point outer diameter (OD) adjacent the transition plane TP of 0.199 inches (0.50546 cms) indicated by the P5 indication on FIGS. 2A and 3A, to (2) an outer diameter of 0.005 inches (0.013 cms) at the drill point 398 indicated by the P11 indication on FIG. 6A.

As best shown in FIGS. 2A and 3A, the first cutting edge 284 extends at an angle P8 to the outer surface of the second shank portion 300. The second cutting edge 294 also extend at an angle P8 to the outer surface of the second shank portion 300. In this example embodiment, P8 which is called the point cutting edge angle is 110.6 degrees.

It should be appreciated that in this example embodiment, the drill tip 380 has a rounded point (and particularly a slightly rounded point). In certain embodiments, the drill tip 380 point is formed as a sharp point and slightly rounded during a finishing manufacturing process. In other embodiments, the drill tip 380 is otherwise suitably rounded or formed. In other embodiments of the present disclosure, the drill tip 380 is not rounded but rather formed with a sharp point.

It should also be appreciated that in this example embodiment, the drill tip 380 is preferably directly positioned along the longitudinal axis X as shown in FIGS. 2, 2B, 3, and 3B, but may slightly vary from being along the longitudinal axis due to manufacturing tolerances.

The relief angle of the drill tip 380 in this example embodiment is 5.2 degrees. This is indicated by the P4 indication on FIGS. 2A and 3A and on Table 2 (FIG. 10).

The point thickness of the drill tip 380 in this example embodiment is 0.119 inches (0.30226 cms). This is indicated by the P6 indication on FIG. 4A and on Table 2 (FIG. 10).

The point flute angle of the drill tip 380 in this example embodiment is 90.0 degrees. This is indicated by the P9 indication on FIG. 4A and on Table 2 (FIG. 10).

The drill point's web thickness of the drill tip 380 in this example embodiment is 0.013 inches (0.03302 cms). This is referred to herein as the drill point web thickness. This is indicated by the P10 indication on FIG. 6A and on Table 2 (FIG. 10).

The center distance of the drill tip 380 in this example embodiment is 0.005 inches (0.0127 cms). This is indicated by the P11 indication on FIG. 6A and on Table 2 (FIG. 10).

The flute detail radius of the drill tip 380 in this example embodiment is 0.011 inches (0.02794 cms). This is indicated by the P12 indication on FIG. 6A and on Table 2 (FIG. 10).

The point outside radius of the drill tip 380 in this example embodiment is 0.072 inches (0.18288 cms). This is indicated by the P13 indication on FIG. 6A and on Table 2 (FIG. 10).

The point eccentricity or total indicator reading (TIR) of the drill tip 380 in this example embodiment is 0.0023 inches (0.0058 cms) (but can be up to 0.005 inches (0.0127 cms) due to manufacturing tolerances) in accordance with the present disclosure. This is indicated by the P14 indication on Table 2 (FIG. 10). It should be appreciated that for the purposes of the present disclosure, the point eccentricity or TIR is the difference between the maximum and minimum measurement readings of an indicator on the planar or cylindrical contoured surfaces of the drill tip 380 representing its/their respective amount(s) of deviation from flatness or roundness. It should also be appreciated that the extremely low point eccentricity or TIR of the drill tip 380 of the present disclosure maximizes the rotation of the second shank portion 300 with minimal deviation from along the longitudinal center axis X of the first and second shank portions 200 and 300 of fastener 50. In various embodiments, this extremely low point eccentricity or TIR of the drill tip 380 is at least partially achieved in the fastener 50 by forging the second shank portion 300 of the fastener 50, but it should be appreciated that such extremely low point eccentricity or TIR of the drill tip 380 could alternatively be achieved in the fastener 50 by milling the second shank portion 300 of the fastener 50 with extremely tight manufacturing tolerances. This configuration of the drill tip 380 and the second shank portion 300 is at least partially responsible for the relatively lower drilling time provided by the fastener 50 of the present disclosure. This configuration provides a more precise tapped thread (and/or slightly smaller hole(s)) in the object(s) in which the fastener 50 is tapped, fastened, and secured. This more precise tapped thread in the object(s) in combination with the enhanced thread engagement provided by the thread formation 400 (as described below) of the fastener 50 is considered to be at least partially responsible for the relatively higher pullout force provided by the fastener 50 of the present disclosure.

The helical thread formation 400 is integrally connected to and extends radially outwardly from respective sections of both the first and second portions 220 and 300 of the shank 200. In this illustrated embodiment, the helical thread formation 400 extends along substantially the entire first shank portion 220 and an initial part of the second shank portion 300. The helical thread formation 400 includes: (1) a first helical thread portion 420; and (2) a second helical thread portion 440.

The helical thread formation 400 has a substantially constant outer diameter from start of the thread formation 400 adjacent to the head 100 to almost the end of the thread formation 400 on the second shank portion 300. At the third thread from the end of the thread formation 400 on the second shank portion 300, the outer diameter or height of the thread formation 400 begins to decrease until gradually terminating at the outer surface of the second shank portion 300. In other words, once reaching that point, the outer diameter of the thread formation 400 tapers radially inwardly until reaching the outer surface of the second shank portion 300.

The helical thread formation 400 has a length (LHTF) indicated on FIG. 3A which in this example embodiment is 0.659 inches (1.67386 cms). This is also indicated by the T4 indication on FIG. 4A and in FIG. 10 Table 2.

The root diameter to the head of the helical thread formation 400 in this example embodiment is 0.075 inches (0.1905 cms). This is indicated by the T2 indication on FIG. 4A and on Table 2 (FIG. 10).

The thread outer diameter (OD) of the helical thread formation 400 in this example embodiment is 0.217 inches (0.55118 cms). This is indicated by the T3 indication on FIGS. 2A and 3A and on Table 2 (FIG. 10).

The pitch distance of the helical thread formation 400 in this example embodiment is 12-24 tpi (and preferably 24 threads per inch (9.449 threads per cm). This is indicated by the T5 indication on FIG. 4A and on Table 2 (FIG. 10).

The root outer diameter (OD) of the helical thread formation 400 in this example embodiment is 0.186 inches (0.47244 cms). This is indicated by the T6 indication on FIGS. 2A and 3A and on Table 2 (FIG. 10).

The blank outer diameter (OD) of the helical thread formation 400 in this example embodiment is 0.195 inches (0.4953 cms). This is indicated by the T7 indication on Table 2 (FIG. 10).

The thread at run-out of the helical thread formation 400 in this example embodiment is 1 thread, which means the thread outer diameter gradually decreased and merges with shank. This is indicated by the T8 indication on FIGS. 2A and 3A and on Table 2 (FIG. 10).

The quantity of threads of the helical thread formation 400 that are adjacent the flutes in this example embodiment is 3 threads. This is indicated by the T9 indication on FIGS. 2A and 3A and on Table 2 (FIG. 10).

The thread up taper of the helical thread formation 400 in this example embodiment is 0.002 (0.00508 cms). This is indicated by the T10 indication on Table 2 (FIG. 10).

As mentioned above, the fastener 50 of the present disclosure provide a plurality of advantages. These advantages are shown in the tables discussed below. These tables are based on actual comparison tests on six commercially available self-drilling self-tapping fasteners and the fastener 50. More specifically, as shown in Tables 1, 2, 3, 4, 5, 6, and 7 respectively provided in FIGS. 9, 10, 11, 12, 13, 14, and 15, the fastener 50 has: (1) an improved performance in drilling time and specifically a relatively lower drilling time, and (2) an improved performance in pullout force and specifically a relatively higher pullout force, both without decreasing performance in any of the ductility, the tapping torque, the torsional strength, and the tension strength of the fastener 50, in comparison to such other fasteners.

More specifically, Table 3 of FIG. 11 shows ductility test results for the self-drilling self-tapping fastener 50 of FIG. 1 in comparison to six example commercially available self-drilling self-tapping fasteners. Table 3 shows that the ductility of the fastener 50 is not different than the ductility of the six commercial fasteners. It should be appreciated that suitable fastener ductility is necessary to avoid hydrogen embrittlement failure, hydrogen assisted stress corrosion failure, and the effects of thermal expansion and contraction of the objects in which the fastener is tapped, fastened, and secured. It should be also be appreciated that industrial standards use suitable bend tests to evaluate a fastener's ductility. As shown in Table 3 of FIG. 1, the tests used to test the ductility of the fasteners tested was a 10 degree head bend test, and. five samples of each fastener were tested. All samples passed the 10 degree bend test except the Fastener-D sample. The failure appears to be due to such fasteners having a higher core hardness and a deeper case. It should thus be appreciated that core hardness and case depth are the two more important factors that determine the fastener's ductility.

Table 4 of FIG. 12 shows torsional strength vs root diameter test results for the self-drilling self-tapping fastener 50 of FIG. 1 in comparison to six commercially available self-drilling self-tapping fasteners. Table 4 shows that the torsional strength of the fastener 50 has the best torsional strength comparing to six commercial fasteners except the Fastener-D sample. It should be appreciated that in addition to material and heat treating, root diameter is one of the more important factors that determines a fastener's torsional strength (i.e., typically, the larger of root diameter, the higher of the torsional strength). It should also be appreciated that, as shown in Table 4, the root diameter of Fastener-B, Fastener-A, and Fastener-F are 88%, 92%, and 84% of the fastener 50, respectively, so their respective torsional strengths are lower than that of the fastener 50, and only 76%, 76%, and 71% of the fastener 50. It should also be appreciated that the Fastener-D has the highest torsional strength, not only because its root diameter is similar (101%) to the fastener 50, but also because it has the highest core hardness. It should be appreciated that higher core hardness will provide higher torsional strength, but high core hardness will reduce fastener's ductility as mentioned above regarding ductility. Fastener-A has a similar root diameter as fastener 50, so it has a good optimum balance of tensile strength and ductility. To reach the optimum balance of ductility and torsional strength, fastener 50 has a root diameter in the range of 0.183-0.189 inches (0.46482 to 0.48006 cms).

Table 5 of FIG. 13 shows tensile strength vs root diameter test results for the self-drilling self-tapping fastener 50 of FIG. 1 in comparison to six commercially available self-drilling self-tapping fasteners. Table 5 shows that the fastener 50 has the best tensile strength comparing to six commercial fasteners. It should also be appreciated that in addition to material and heat treating, root diameter is the more important factor that determines fastener's tensile strength (e.g., generally the larger the root diameter, the higher of the tensile strength). As Table 5 shows, the root diameter of Fastener-B, Fastener-A, and Fastener-F are 88%, 92%, and 84% of the fastener 50, respectively, so their respective tensile strengths are lower than the fastener 50, and only 72%, 82% and 83% of the fastener 50. On the other hand, Fastener-A has a similar root diameter as fastener 50, so it also has a comparable tensile strength. To reach the best performance of fastener tensile strength, the fastener 50 has a root diameter in the range of 0.183 to 0.189 inches (0.46482 to 0.48006 cms).

Table 6 of FIG. 14 shows pullout vs thread engagement test results for the self-drilling self-tapping fastener 50 of FIG. 1 in comparison to six commercially available self-drilling self-tapping fasteners. If fastener material, heat treatment, and thread profile are the same, screw thread engagement with the substrate, or the difference of thread OD and drill point OD, appears to be the more important factor that determines the fastener pullout value from the substrate (e.g., the larger the difference, the higher of the pullout value). However, the larger the difference, the harder it is for the threads to tap into the substrate, and thus the higher the tapping torque. Table 6 shows that the fastener 50 has the best pullout performance, followed by Fastener-A and Fastener-D that respectively have 97% and 96% of the pullout value of Fastener 50. Fastener-D has 98% of thread engagement of fastener 50, so it has 96% of the pullout value of fastener 50. Fastener-A has a little larger thread engagement (101%) than fastener 50, but a little lower pullout force (97%) than fastener 50 because Fastener-A has a larger point eccentricity, so the actual hole size Fastener-A drilled is larger than the point OD, which reduced its pullout value. Fastener-B, Fastener-C, Fastener-A, and Fastener-F have much lower pullout values (84%, 88%, 85%, 79%, respectively) since their thread engagements are also smaller (92%, 83%, 66%, 92% compared to fastener 50). Table 6 thus shows that the pullout force of the fastener 50 is significantly higher than the pullout force of each of the six commercial fasteners. It should be appreciated that if the fastener material, heat treatment, and thread profile are the same, the thread engagement with the steel object or the difference of thread OD and drill point OD thus appear to be the more important factor(s) that determine the fastener pullout value from an object (e.g., generally the larger of the difference the higher of the pullout value). It should further be appreciated that the larger the difference, the harder for the threads to tap into the object(s), or the higher the tapping torque will be. It should also be appreciated from Table 6 that the fastener 50 has the best pullout value in part due to the thread engagement of around 0.018 inches (0.046 cms). To reach the best pullout performance and a reasonable drill tapping torque, the fastener 50 has a thread engagement in the range of 0.018 to 0.019 inches (0.0457 to 0.0483 cms), and the drill point eccentricity is less than 0.005 inches (0.00127 cms). It should be appreciated that this drill point eccentricity may be achieved via forging the second shank portion 300 or by milling this second shank portion with tight manufacturing tolerances.

It should further be appreciated that to reach the best pullout performance and at the same time to keep the tapping torque at a reasonable low level, the fastener 50 has a second shank portion 300 with the combination of the chip breakers and the thread formation 400 with only 3 threads at the flute transition section on one side of the fastener 50.

Table 7 of FIG. 15 shows drilling time/torque vs point geometry test results for the self-drilling self-tapping fastener 50 of FIG. 1 in comparison to six commercially available self-drilling self-tapping fasteners for both tests on ⅜ inch thick steel plate and ½ inch thick steel plate. As mentioned above, Table 7 shows that the drilling time of the fastener 50 is significantly lower than the drilling times of each of the six commercial fasteners. These comparisons show that drill point geometry is an important factor that determines drilling time. Generally, the sharper the drill point is, the faster it can drill into a steel substrate, and the less drilling time is needed to drill through the steel substrate. However, since the self-drilling self-tapping fastener 50 must be able to drill through at least ½ inch thick steel plate, if the drill point is too sharp, it will be worn easily, and then cannot drill through such substrate or may need more time to do so. Thus, the drill point sharpness of the fastener 50 appears to be important in obtaining this lowest drilling time. The fastener 50 has a cutting edge center distance in the range of 0.003 inches to 0.005 inches, a drill point web thickness in the range of 0.010 inches to 0.015 inches, and a point cutting edge angle in the range of 109 to 111 degrees. These features appear to provide the fastener 50 with this significantly lower drilling time. It should be appreciated from the above that the fastener 50 has: (1) an improved performance in drilling time and specifically a relatively lower drilling time, and (2) an improved performance in pullout force and specifically a relatively higher pullout force, all without decreasing performance in any of the comparative ductility, tapping torque, torsional strength, or tension strength of the fastener 50, when compared to various known commercially available self-drilling self-tapping fasteners of the similar size and form.

It should be appreciated that the above dimensions are subject to reasonable variation due to manufacturing tolerances in accordance with the present disclosure. It should also be appreciated that the above dimensions are based on actual measurements and thus take into account manufacturing tolerances. It should further be appreciated that the actual designed dimensions may be different and result in such actual manufacturing tolerances in accordance with the present disclosure.

In further embodiments of the present disclosure, the fastener length may vary. In one example alternative embodiment, the fastener is a #12-24×1½ inch fastener and is ¼ inches longer than fastener 50. In another example alternative embodiment, the fastener 50 is a #12-24×1¾ inch fastener and is ½ inches longer than fastener 50. In another example alternative embodiment, the fastener 50 is a #12-24×2.0 inch fastener and is ¾ inches longer than fastener 50. In these example alternative embodiments, the respective thread lengths have increased by a ¼ inch, a ½ inch, and ¾ inches for each of above respective fasteners, but the other dimensions are identical.

It will be understood that modifications and variations may be effected without departing from the scope of the novel concepts of the present invention, and it is understood that this application is to be limited only by the scope of the claims.

The invention claimed is:

1. A self-drilling self-tapping fastener comprising:
a head;
a shank integrally connected to and extending from the head, the shank including a first shank portion and a second shank portion, the second shank portion defining a longitudinally extending first flute, the second shank portion defining a longitudinally extending second flute, the second shank portion including a first chip breaker positioned in the first flute, the second shank portion including a longitudinally extending first surface and a longitudinally extending second surface, wherein the first surface and second surface meet along a longitudinally extending connection line, and a second chip breaker including a first, second, third, and fourth connected surfaces positioned in the second flute, the second shank portion including a drill tip, the drill tip including a first cutting blade having a first cutting edge and a second cutting blade having a second cutting edge, wherein the first cutting edge and the second cutting edge are tapered toward each other, and wherein the second chip breaker contacts the first surface and the second surface of the second shank portion; and
a helical thread formation integrally connected to and extending radially outwardly from the first shank portion and part of the second shank portion, wherein the first flute extends through three threads of the thread formation on a first side of the second shank portion, but not to the fourth thread on the first side of the second shank portion.

2. The self-drilling self-tapping fastener of claim 1, wherein the second flute extends through three threads of the thread formation on a second side of the second shank portion and to but not through a fourth thread formation on the second side of the second shank portion.

3. The self-drilling self-tapping fastener of claim 1, wherein the second shank portion is forged.

4. The self-drilling self-tapping fastener of claim 1, wherein the first flute includes a longitudinally extending first surface and a longitudinally extending second surface that meet along a longitudinally extending connection line, wherein the first flute narrows almost to a point at a first end of the second shank portion, widens toward a central section of the second shank portion, and remains wide through the drill tip to a second end of the second shank portion, wherein the second flute includes a longitudinally extending first surface and a longitudinally extending second surface that meet along a longitudinally extending connection line, wherein the second flute narrows almost to a point at the first end of the second shank portion, widens toward the central section of the second shank portion, and remains wide through the drill tip to the second end of the second shank portion.

5. The self-drilling self-tapping fastener of claim 1, wherein the drill tip has a cutting edge center distance in the range of 0.003 inches to 0.005 inches, a drill point web thickness in the range of 0.010 inches to 0.015 inches, and a point cutting edge angle in a range of 109 to 111 degrees.

6. The self-drilling self-tapping fastener of claim 5, wherein the drill point web thickness is 0.013 inches, and wherein the cutting edge center distance is 0.005 inches.

7. The self-drilling self-tapping fastener of claim 5, wherein the drill tip has a drill point eccentricity of less than 0.005 inches.

8. The self-drilling self-tapping fastener of claim 5, wherein the drill tip has a drill point eccentricity of 0.0023 inches.

9. The self-drilling self-tapping fastener of claim 1, wherein the drill tip has a drill point eccentricity of less than 0.005 inches.

10. The self-drilling self-tapping fastener of claim 9, wherein the helical thread formation has a thread engagement in a range of 0.018 to 0.019 inches.

11. The self-drilling self-tapping fastener of claim 1, wherein the helical thread formation has a thread engagement in a range of 0.018 to 0.019 inches.

12. A self-drilling self-tapping fastener comprising:
a head;
a shank integrally connected to and extending from the head, the shank including a first shank portion and a second shank portion, the second shank portion defining a longitudinally extending first flute, the second shank portion defining a longitudinally extending second flute, the second shank portion including a first chip breaker positioned in the first flute, the second shank portion including a second chip breaker positioned in the second flute, the second shank portion including a drill tip, the drill tip including a first cutting blade having a first cutting edge and a second cutting blade having a second cutting edge, wherein the first cutting edge and the second cutting edge are tapered toward each other, wherein the drill tip has a cutting edge center distance in a range of 0.003 inches to 0.005 inches, a drill point web thickness in a range of 0.010 inches to 0.015 inches, and a point cutting edge angle in a range of 109 to 111 degrees; and
a helical thread formation integrally connected to and extending radially outwardly from the first shank portion and part of the second shank portion, wherein the helical thread formation has a thread engagement in a range of 0.018 to 0.019 inches.

13. The self-drilling self-tapping fastener of claim 12, wherein the first flute extends through three threads of the thread formation on a first side of the second shank portion and not to the fourth thread formation.

14. The self-drilling self-tapping fastener of claim 12, wherein the drill tip has a drill point eccentricity of less than 0.005 inches.

15. A self-drilling self-tapping fastener comprising:
a head;
a shank integrally connected to and extending from the head, the shank including:
(a) a first shank portion, and
(b) a second shank portion:
(i) including a drill tip, the drill tip including a first cutting blade having a first cutting edge and a second cutting blade having a second cutting edge, wherein the first cutting edge and the second cutting edge are tapered toward each other, wherein the drill tip has a cutting edge center distance in a range of 0.003 inches to 0.005 inches, a drill point web thickness in a range of 0.010 inches to 0.015 inches, and a point cutting edge angle in a range of 109 to 111 degrees, wherein the drill tip has a drill point eccentricity of less than 0.005 inches,
(ii) defining a longitudinally extending first flute, wherein the first flute includes a longitudinally extending first surface and a longitudinally extending second surface that meet along a longitudinally extending connection line, wherein the first flute narrows almost to a point at a first end of the second shank portion, widens toward a central section of the second shank portion, and remains wide through the drill tip to a second end of the second shank portion,
(iii) defining a longitudinally extending second flute, wherein the second flute includes a longitudinally extending first surface and a longitudinally extending second surface that meet along a longitudinally extending connection line, wherein the second flute narrows almost to a point at the first end of the second shank portion, widens toward the central section of the second shank portion, and remains wide through the drill tip to the second end of the second shank portion,
(iv) including a first chip breaker positioned in the first flute, and
(v) the second shank portion including a second chip breaker positioned in the second flute; and
a helical thread formation integrally connected to and extending radially outwardly from the first shank portion and part of the second shank portion, wherein the helical thread formation has a thread engagement in a range of 0.018 to 0.019 inches, and wherein the first flute extends through three threads of the thread formation on a first side of the second shank portion and not to the fourth thread formation.

16. The self-drilling self-tapping fastener of claim 15 wherein the second flute extends through three threads of the thread formation on a second side of the second shank portion and to but not through a fourth thread formation on the second side of the second shank portion.

17. The self-drilling self-tapping fastener of claim 15, wherein the second shank portion is forged.

18. A self-drilling self-tapping fastener comprising:
a head;
a shank integrally connected to and extending from the head, the shank including a first shank portion and a second shank portion, the second shank portion defining a longitudinally extending first flute, the second shank portion defining a longitudinally extending second flute, the second shank portion including a first chip breaker positioned in the first flute, the second shank portion including a second chip breaker positioned in the second flute, the second shank portion including a drill tip, the drill tip including a first cutting blade having a first cutting edge and a second cutting blade having a second cutting edge, wherein the first cutting edge and the second cutting edge are tapered toward each other; and
a helical thread formation integrally connected to and extending radially outwardly from the first shank portion and part of the second shank portion, wherein the first flute extends through three threads of the thread formation on a first side of the second shank portion, but not to the fourth thread on the first side of the second shank portion,
wherein the drill point web thickness is 0.013 inches, and wherein the cutting edge center distance is 0.005 inches.

19. The self-drilling self-tapping fastener of claim 18, wherein the second flute extends through three threads of the thread formation on a second side of the second shank portion and to but not through a fourth thread formation on the second side of the second shank portion.

20. The self-drilling self-tapping fastener of claim 18, wherein the second shank portion is forged.

21. The self-drilling self-tapping fastener of claim 18, wherein the first flute includes a longitudinally extending first surface and a longitudinally extending second surface that meet along a longitudinally extending connection line, wherein the first flute narrows almost to a point at a first end of the second shank portion, widens toward a central section of the second shank portion, and remains wide through the drill tip to a second end of the second shank portion, wherein the second flute includes a longitudinally extending first surface and a longitudinally extending second surface that meet along a longitudinally extending connection line, wherein the second flute narrows almost to a point at the first end of the second shank portion, widens toward the central section of the second shank portion, and remains wide through the drill tip to the second end of the second shank portion.

22. The self-drilling self-tapping fastener of claim 18, wherein the drill tip has a point cutting edge angle in a range of 109 to 111 degrees.

23. A self-drilling self-tapping fastener comprising:
a head;
a shank integrally connected to and extending from the head, the shank including a first shank portion and a second shank portion, the second shank portion defining a longitudinally extending first flute, the second shank portion defining a longitudinally extending second flute, the second shank portion including a first chip breaker positioned in the first flute, the second shank portion including a second chip breaker positioned in the second flute, the second shank portion including a drill tip, the drill tip including a first cutting blade having a first cutting edge and a second cutting blade having a second cutting edge, wherein the first cutting edge and the second cutting edge are tapered toward each other; and
a helical thread formation integrally connected to and extending radially outwardly from the first shank portion and part of the second shank portion, wherein the first flute extends through three threads of the thread formation on a first side of the second shank portion, but not to the fourth thread on the first side of the second shank portion,
wherein the drill tip has a drill point eccentricity of 0.0023 inches.

24. The self-drilling self-tapping fastener of claim 23, wherein the second flute extends through three threads of the thread formation on a second side of the second shank portion and to but not through a fourth thread formation on the second side of the second shank portion.

25. The self-drilling self-tapping fastener of claim 23, wherein the second shank portion is forged.

26. The self-drilling self-tapping fastener of claim 23, wherein the first flute includes a longitudinally extending first surface and a longitudinally extending second surface that meet along a longitudinally extending connection line, wherein the first flute narrows almost to a point at a first end of the second shank portion, widens toward a central section of the second shank portion, and remains wide through the drill tip to a second end of the second shank portion, wherein the second flute includes a longitudinally extending first surface and a longitudinally extending second surface that meet along a longitudinally extending connection line, wherein the second flute narrows almost to a point at the first end of the second shank portion, widens toward the central section of the second shank portion, and remains wide through the drill tip to the second end of the second shank portion.

27. The self-drilling self-tapping fastener of claim 23, wherein the drill tip has a cutting edge center distance in the range of 0.003 inches to 0.005 inches, a drill point web thickness in the range of 0.010 inches to 0.015 inches, and a point cutting edge angle in a range of 109 to 111 degrees.

\* \* \* \* \*